United States Patent
Mutalik et al.

(10) Patent No.: US 10,476,955 B2
(45) Date of Patent: Nov. 12, 2019

(54) STREAMING AND SEQUENTIAL DATA REPLICATION

(71) Applicant: Actifio, Inc., Waltham, MA (US)

(72) Inventors: Madhav Mutalik, Waltham, MA (US); Satya Sri Kanth Palaparthi, Waltham, MA (US); Suresh Ganta, Kukatpally (IN)

(73) Assignee: Actifio, Inc., Waltham, MA (US)

( * ) Notice: Subject to any disclaimer, the term of this patent is extended or adjusted under 35 U.S.C. 154(b) by 33 days.

(21) Appl. No.: 15/612,241

(22) Filed: Jun. 2, 2017

(65) Prior Publication Data

US 2017/0353550 A1     Dec. 7, 2017

Related U.S. Application Data

(60) Provisional application No. 62/344,662, filed on Jun. 2, 2016.

(51) Int. Cl.
*H04L 29/08* (2006.01)
*H04L 12/26* (2006.01)

(52) U.S. Cl.
CPC ...... *H04L 67/1095* (2013.01); *G06F 2201/84* (2013.01); *H04L 43/0882* (2013.01)

(58) Field of Classification Search
CPC ............. H04L 67/1095; H04L 43/0882; G06F 2201/84
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |
| 5,497,483 A | 3/1996 | Beardsley et al. |
| 5,535,381 A | 7/1996 | Kopper |
| 5,819,292 A | 10/1998 | Hitz et al. |
| 5,828,876 A | 10/1998 | Fish et al. |
| 5,857,208 A | 1/1999 | Ofek |
| 5,963,962 A | 10/1999 | Hitz et al. |
| 6,065,018 A | 5/2000 | Beier et al. |
| 6,081,875 A | 6/2000 | Clifton et al. |
| 6,119,208 A | 9/2000 | White et al. |

(Continued)

OTHER PUBLICATIONS

Azagury et al., "Point-in-Time Copy: Yesterday, Today and Tomorrow," IBM Research Lab in Haifa, pp. 259-270 (2002).

(Continued)

*Primary Examiner* — Nicholas R Taylor
*Assistant Examiner* — Sanjoy K Roy
(74) *Attorney, Agent, or Firm* — Wilmer Cutler Pickering Hale and Dorr LLP

(57) ABSTRACT

Systems and methods of capturing application data locally on a source data management system and performing a high performance, bandwidth optimized replication the data from the source data management system to a remote data management system either (a) in parallel with copying data from an application to the source data management system, or (b) serially by replicating the data to the remote data management system after the data is copied to the source data management system, wherein the determination to operate in parallel or serially is based on at least one of a characteristic of the data and user specified tuning parameters.

20 Claims, 15 Drawing Sheets

(56) References Cited

U.S. PATENT DOCUMENTS

| | | | |
|---|---|---|---|
| 6,131,148 A * | 10/2000 | West | G06F 11/1446 |
| | | | 707/999.202 |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St. Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,484,186 B1 | 11/2002 | Rungta | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,772,302 B1 | 8/2004 | Thompson | |
| 6,779,094 B2 | 8/2004 | Selkirk et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,428,657 B2 | 9/2008 | Yamasaki | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,814,128 B2 | 10/2010 | Silvers et al. | |
| 7,937,547 B2 | 5/2011 | Liu et al. | |
| 8,037,032 B2 | 10/2011 | Pershin et al. | |
| 8,139,575 B2 | 3/2012 | Biran et al. | |
| 8,150,808 B2 | 4/2012 | Zha et al. | |
| 8,180,740 B1 | 5/2012 | Stager et al. | |
| 8,299,944 B2 | 10/2012 | Provenzano | |
| 8,407,191 B1 | 3/2013 | Nanda | |
| 8,706,833 B1 | 4/2014 | Bergant et al. | |
| 8,788,769 B2 | 7/2014 | Abercrombie et al. | |
| 9,632,716 B1 * | 4/2017 | Harris, Jr. | G06F 3/0619 |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2004/0199570 A1 | 10/2004 | Terao | |
| 2004/0267836 A1 * | 12/2004 | Armangau | G06F 11/1435 |
| 2005/0066095 A1 | 3/2005 | Mullick et al. | |
| 2005/0165794 A1 | 7/2005 | Mosescu | |
| 2006/0074945 A1 | 4/2006 | Mori | |
| 2006/0236047 A1 * | 10/2006 | Shitomi | G06F 11/1662 |
| | | | 711/162 |
| 2008/0320261 A1 * | 12/2008 | Colgrove | G06F 11/2064 |
| | | | 711/162 |
| 2009/0222496 A1 | 9/2009 | Liu et al. | |
| 2011/0029748 A1 * | 2/2011 | Nakamura | G06F 11/1451 |
| | | | 711/162 |
| 2011/0258161 A1 | 10/2011 | Constantinescu et al. | |
| 2014/0164323 A1 * | 6/2014 | Park | G06F 17/30174 |
| | | | 707/611 |
| 2015/0112938 A1 * | 4/2015 | Swift | H04L 67/1095 |
| | | | 707/639 |
| 2016/0132400 A1 * | 5/2016 | Pawar | G06F 11/1458 |
| | | | 707/679 |

OTHER PUBLICATIONS

Baker, "Disk-Based Mirroring Is A Lot More Than Just Safe," Computer Technology Review, pp. 55-57 (2000).

Brown et al., "SnapMirror and SnapRestore: Advances in Snapshot Technology," retrieved online <https://web.archive.org/web/20011126183455/http://www.netapp.com/tech_library/3043.html>, 13 pages.

EMC, "EMC Corporation TimeFinder Product Description Guide," 34 pages (1998).

Exhibit 1006v2 IPR2015-01689, Version 2, File History for U.S. Appl. No. 12/947,393, filed Nov. 16, 2010, 177 pages.

Exhibit 1006v3 IPR2015-01689, Version 3, File History for U.S. Appl. No. 12/947,393, filed Nov. 16, 2010, 150 pages.

Exhibit 1006v4 IPR2015-01689, Version 4, File History for U.S. Appl. No. 12/947,393, filed Nov. 16, 2010, 98 pages.

Exhibit 1008v2 IPR2015-01678, Version 2, File History for U.S. Appl. No. 12/947,438, filed Nov. 16, 2010, 103 pages.

Innovation Data Processing, "FDR InstantBackup™ . . . Innovation Instant Solutions," 2 pages.

Alapati, "NetApp Technical Report: SnapMirror Sync and SnapMirror Semi-Sync Overview and Design Considerations," NetApp, 24 pages (Jul. 2010).

American Megatrends, Inc., "StorTrends/ManageTrends® (Version 2.7) User's Guide for the StorTrends 1300 Storage Appliance," 378 pages (Mar. 23, 2009).

Arrell et al., "Using RVA and SnapShot for Business Intelligence Applications with OS/390 and DB2," IBM, Redbooks, August 70 pages (1998).

Baird, "Virtual Storage Architecture Guide (VSAG)," IEEE, pp. 312-326 (1995).

Cederqvist et al., "Version Management with CVS," 122 pages (1992).

Chang et al., "Performance Analysis of Two Frozen Image Based Backup/Restore Methods," IEEE International Conference on Electron Information Technology 2005, 7 pages (May 22-25, 2005).

Chapman et al., "SnapMirror® Best Practices Guide," Network Appliance, Inc., 63 pages (Apr. 2006).

Chatterjee et al., "Efficient Replication Leveraging Information Lifecycle Management in Data Storage Systems," Provisional Patent Application, 25 pages (filed Feb. 9, 2009).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 17 pages (1998).

Chutani et al., "The Episode File System," Usenix Association, Proceedings of the Winter 1992 Usenix Conference, San Francisco, California, 19 pages (Jan. 20-24, 1992).

CommVault, "CommVault® Simpana® Quick Recovery® Software for Critical Data Center Applications and File Systems," 35 pages (2010).

Dantz Development Corporation, "Retrospect® User's Guide," 262 pages (2002).

Degwekar, "Using SnapMirror® with SnapDrive® for Unix®," 11 pages (2007).

Delphix Corp.'s Invalidity Contentions Under Patent L.R. 3-3, 27 pages (Jul. 24, 2014).

Edwards et al., "FlexVol: Flexible, Efficient File Volume Virtualization in WAFL," Usenix Association, Usenix '08: 2008 Usenix Annual Technical Conference, pp. 129-142 (2008).

You et al., "Deep Store: An Archival Storage System Architecture," Proceedings of the 21st International Conference on Data Engineering, 12 pages (2005).

Zhang et al., "yFS: A Journaling File System Design for Handling Large Data Sets with Reduced Seeking," Usenix Association, Pro-

(56) References Cited

OTHER PUBLICATIONS ceedings of Fast '03: 2nd Usenix Conference on File and Storage Technologies, San Francisco, California, 15 pages (Mar. 31-Apr. 2, 2003).
EMC, "Backup of Oracle in EMC Symmetrix Environments with EMC NetWorker PowerSnap," 25 pages (Aug. 2008).
Zhu et al., "Avoiding the Disk Bottleneck in the Data Domain Deduplication File System," Proceedings of the 6th Usenix Conference on File and Storage Technologies FAST 2008, San Jose, California, 14 pages (2008).
EMC, "EMC Celerra Version 5.6 Technical Primer: SLA-Driven Replication with Celerra Replicator (V2): Technology Concepts and Business Considerations," 20 pages (Jul. 2008).
EMC, "EMC DL1500 and DL3000 with EMC NetWorker: Best Practices Planning," 36 pages (Jul. 2009).
EMC, "Next-Generation Backup-to-Disk: Building the Foundation for Effective Operational Recovery Management," 9 pages (Jan. 31, 2005).
EMC, "Unified Backup and Recovery with EMC NetWorker," 16 pages (Mar. 2010).
Exhibit 1004 IPR2015-01689, Declaration of Ellie Young, 24 pages (Aug. 5, 2015).
Exhibit 1006 IPR2015-01678, Pfaffenberger, Webster's New World Computer Dictionary Ninth Edition, Hungry Minds, Inc., New York, New York, 4 pages (2001).
Exhibit 1006 IPR2015-01689, File History for U.S. Appl. No. 12/947,393, filed Nov. 16, 2010, 108 pages.
Exhibit 1007 IPR2015-01678, Microsoft Computer Dictionary Fourth Edition, Microsoft Press, Redmond, Washington, 3 pages (1999).
Exhibit 1007 IPR2015-01689, Declaration of Prashant Shenoy, Ph.D. in Support of Petition for Inter Partes Review, 82 pages (Aug. 5, 2015).
Exhibit 1008 IPR2015-01678, File History for U.S. Appl. No. 12/947,438, filed Nov. 16, 2010, 100 pages.
Exhibit 1009 IPR2015-01678, Declaration of Prashant Shenoy, Ph.D. in Support of Petition for Inter Partes Review, 58 pages (Aug. 5, 2015).
Exhibit 1010 IPR2015-01678, Rivest, "The MD5 Message-Digest Algorithm," retrieved online <https://www.ietf.org/rfc/rfc1321.txt>, 20 pages (Apr. 1992).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, 24 pages (Apr. 17, 1995).
Exhibit A-01 to Delphix Corp.'s Preliminary Invalidity and Non-Infringement Contentions, "Data Domain ("Data Domain") as Prior Art to U.S. Pat. No. 6,732,244," 7 pages (Jul. 3, 2015).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," 7 pages (Jul. 3, 2015).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," 7 pages (Jul. 3, 2015).
Exhibit A-04 to Delphix Corp.'s Preliminary Invalidity and Non-Infringement Contentions, "U.S. Pat. No. 6,269,431 as Prior Art to U.S. Pat. No. 6,732,244," 27 pages (Jul. 3, 2015).
Exhibit A-05 to Delphix Corp.'s Preliminary Invalidity and Non-Infringement Contentions, "U.S. Pat. No. 6,915,397 ("The '397 patent") as Prior Art to U.S. Pat. No. 6,732,244," 44 pages (Jul. 3, 2015).
Exhibit A-06 to Delphix Corp.'s Preliminary Invalidity and Non-Infringement Contentions, "Hutchinson as Claim Chart for U.S. Pat. No. 6,732,244," 64 pages (Jul. 3, 2015).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," 35 pages (Jul. 3, 2015).
Exhibit A-08 to Delphix Corp.'s Preliminary Invalidity and Non-Infringement Contentions, "EMC TimeFinder as Prior Art to U.S. Pat. No. 6,732,244," 51 pages (Jul. 3, 2015).
Exhibit A-09 to Delphix Corp.'s Preliminary Invalidity and Non-Infringement Contentions, "U.S. Pat. No. 6,434,681 as Prior Art to U.S. Pat. No. 6,732,244," 19 pages (Jul. 3, 2015).
Exhibit A-10 to Delphix Corp.'s Preliminary Invalidity and Non-Infringement Contentions, "U.S. Pat. No. 7,072,916 ("The '916 patent") as Prior Art to U.S. Pat. No. 6,732,244," 65 pages (Jul. 3, 2015).
Exhibit A-11 to Delphix Corp.'s Preliminary Invalidity and Non-Infringement Contentions, "U.S. Pat. No. 6,898,688 as Prior Art to U.S. Pat. No. 6,732,244," 35 pages (Jul. 3, 2015).
Exhibit A-12 to Delphix Corp.'s Preliminary Invalidity and Non-Infringement Contentions, "Chervenak as Prior Art to U.S. Pat. No. 6,732,244," 21 pages (Jul. 3, 2015).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," 52 pages (Jul. 3, 2015).
Exhibit A-14 to Delphix Corp.'s Preliminary Invalidity and Non-Infringement Contentions, "Green, *Designing a Fast On-line Backup System for a Log-structured File System* as Prior Art to U.S. Pat. No. 6,732,244," 80 pages (Jul. 3, 2015).
Exhibit A-15 to Delphix Corp.'s Preliminary Invalidity and Non-Infringement Contentions, "U.S. Pat. No. 5,535,381 as Prior Art to U.S. Pat. No. 6,732,244," 53 pages (Jul. 3, 2015).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," 68 pages (Jul. 3, 2015).
Exhibit A-17 to Delphix Corp.'s Preliminary Invalidity and Non-Infringement Contentions, "The Episode File System ("Episode") as Prior Art to U.S. Pat. No. 6,732,244," 21 pages (Jul. 3, 2015).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," 34 pages (Jul. 3, 2015).
Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," 44 pages (Jul. 3, 2015).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," 59 pages (Jul. 3, 2015).
Exhibit A-21 to Delphix Corp.'s Preliminary Invalidity and Non-Infringement Contentions, "EMC TimeFinder as Prior Art to U.S. Pat. No. 6,732,244," 51 pages (Jul. 3, 2015).
Exhibit A-22 to Delphix Corp.'s Preliminary Invalidity and Non-Infringement Contentions, "Retrospect as Prior Art to U.S. Pat. No. 6,732,244," 12 pages (Jul. 3, 2015).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," 25 pages (Jul. 3, 2015).
Exhibit B-01 to Delphix Corp.'s Preliminary Invalidity and Non-Infringement Contentions, "Data Domain ("Data Domain") as Prior Art to U.S. Pat. No. 6,959,369," 10 pages (Jul. 3, 2015).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," 10 pages (Jul. 3, 2015).
Exhibit B-03 to Delphix Corp.'s Preliminary Invalidity and Non-Infringement Contentions, "U.S. Pat. No. 6,269,431 as Prior Art to U.S. Pat. No. 6,959,369," 42 pages (Jul. 3, 2015).
Exhibit B-04 to Delphix Corp.'s Preliminary Invalidity and Non-Infringement Contentions, "Green, *Designing a Fast On-line Backup System for a Log-structured File System* as Prior Art to U.S. Pat. No. 6,959,369," 104 pages (Jul. 3, 2015).
Exhibit B-05 to Delphix Corp.'s Preliminary Invalidity and Non-Infringement Contentions, "U.S. Pat. No. 5,535,381 as Prior Art to U.S. Pat. No. 6,959,369," 84 pages (Jul. 3, 2015).
Exhibit B-06 to Delphix Corp.'s Preliminary Invalidity and Non-Infringement Contentions, "Hutchinson as Claim Chart for U.S. Pat. No. 6,959,369," 80 pages (Jul. 3, 2015).

(56) References Cited

OTHER PUBLICATIONS

Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," 67 pages (Jul. 3, 2015).
Exhibit B-08 to Delphix Corp.'s Preliminary Invalidity and Non-Infringement Contentions, "U.S. Pat. No. 6,898,688 as Prior Art to U.S. Pat. No. 6,959,369," 53 pages (Jul. 3, 2015).
Exhibit B-09 to Delphix Corp.'s Preliminary Invalidity and Non-Infringement Contentions, "U.S. Pat. No. 6,434,681 as Prior Art to U.S. Pat. No. 6,959,369," 44 pages (Jul. 3, 2015).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," 59 pages (Jul. 3, 2015).
Exhibit B-11 to Delphix Corp.'s Preliminary Invalidity and Non-Infringement Contentions, "Chervenak as Prior Art to U.S. Pat. No. 6,959,369," 69 pages (Jul. 3, 2015).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," 54 pages (Jul. 3, 2015).
Exhibit B-13 to Delphix Corp.'s Preliminary Invalidity and Non-Infringement Contentions, "Petal: *Distributed Virtual Disks* (Lee) as Prior Art to U.S. Pat. No. 6,959,369," 51 pages (Jul. 3, 2015).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," 94 pages (Jul. 3, 2015).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," 89 pages (Jul. 3, 2015).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," 65 pages (Jul. 3, 2015).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," 92 pages (Jul. 3, 2015).
Exhibit B-18 to Delphix Corp.'s Preliminary Invalidity and Non-Infringement Contentions, "Retrospect as Prior Art to U.S. Pat. No. 6,959,369," 35 pages (Jul. 3, 2015).
Exhibit B-19 to Delphix Corp.'s Preliminary Invalidity and Non-Infringement Contentions, "EMC TimeFinder as Prior Art to U.S. Pat. No. 6,959,369," 90 pages (Jul. 3, 2015).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," 70 pages (Jul. 3, 2015).
Exhibit B-21 to Delphix Corp.'s Preliminary Invalidity and Non-Infringement Contentions, "NetApp Data Protection Solution ("NetApp") as Prior Art to U.S. Pat. No. 6,959,369," 58 pages (Jul. 3, 2015).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," 43 pages (Jul. 3, 2015).
Friess et al., "Windows NT Backup and Recovery with ADSM," IBM, Redbooks, 190 pages (May 1998).
Galli, "Journal File Systems in Linux," Upgrade, The European Online Magazine for the IT Professional, vol. 2, No. 6, 8 pages (Dec. 2001).
Garrett et al., "Syncsort Backup Express and NetApp: Advanced Data Protection and Disaster Recovery," Enterprise Strategy Group, 19 pages (Jan. 2009).
Gordon, "High Noon-Backup and Recovery: What Works, What Doesn't and Why," Enterprise Systems Journal, vol. 15, No. 9, 5 pages (Sep. 2000).

Green et al., "Designing a Fast, On-Line Backup System for a Log-Structured File System," Digital Technical Journal, vol. 8, No. 2, pp. 32-45 (1996).
Gu et al., "DB2 UDB Backup and Recovery with ESS Copy Services," IBM, Redbooks, 144 pages (Aug. 2002).
Hendricks et al., "Improving Small File Performance in Object-Based Storage," Parallel Data Laboratory, Carnegie Mellon University, Pittsburgh, Pennsylvania, 21 pages (May 2006).
Herrin II et al., "The Viva File System," retrieved online <http://www.cs.wisc.edu/~shankar/Viva/viva.html>, 26 pages (Jun. 14, 1997).
Heyt et al., "Tivoli Storage Manager Version 3.7: Technical Guide," IBM, Redbooks, December 248 pages (1999).
Hitz et al., "File System Design for an NFS File Server Appliance," Network Appliance, 23 pages (Jan. 19, 1994).
Holton et al., "XFS: A Next Generation Journalled 64-Bit Filesystem with Guaranteed Rate I/O," retrieved online <http://www.sgi.com/Technology/xfs-whitepaper.html>, 15 pages (Jun. 5, 1997).
Hutchinson, "Logical vs. Physical File System Backup," Usenix Association, Proceedings of the 3rd Symposium on Operating Systems Design and Implementation, New Orleans, Louisiana, 12 pages (Feb. 1999).
IBM, "IBM RAMAC Virtual Array," IBM, Redbooks, 490 pages (Jul. 1997).
IBM, "Setting Up and Implementing ADSTAR Distributed Storage Manager/400," IBM, Redbooks, 350 pages (Mar. 1995).
Informix Corporation, "Informix Backup and Restore Guide," 280 pages (Dec. 1999).
Informix Corporation, "Informix Storage Manager: Administrator's Guide," 166 pages (Dec. 1999).
Isilon Systems, "Backup and Recovery with Isilon IQ Clustered Storage," 19 pages (Aug. 2007).
Kara, "Ext4, btrfs and the others," Linux-Kongress, The International Linux System Technology Conference, 15 pages (Oct. 30, 2009).
Keeton et al., "A Framework for Evaluating Storage System Dependability," Proceedings of the 2004 International Conference on Dependable Systems and Networks, 10 pages (2004).
Kim et al., "Volume Management in SAN Environment," IEEE, pp. 500-505 (2001).
Klivansky, "A Thorough Introduction to FlexClone™ Volumes," Network Appliance, Inc., 35 pages (Oct. 2004).
Klosterman, "Delayed Instantiation Bulk Operations for Management of Distributed, Object-Based Storage Systems," Department of Electrical and Computer Engineering, Carnegie Mellon University, Pittsburgh, Pennsylvania, 255 pages (Aug. 2009).
Kulkarni et al., "Redundancy Elimination Within Large Collections of Files," Usenix Association, Proceedings of the General Track: 2004 Usenix Annual Technical Conference, Boston, MA, 15 pages (Jun. 27-Jul. 2, 2004).
Lee et al., "A Comparison of Two Distributed Disk Systems," Systems Research Center, Palo Alto, California, 25 pages (Apr. 30, 1998).
Lee et al., "Petal: Distributed Virtual Disks," ACM, pp. 84-92 (1996).
Legato, "Legato NetWorker® Release 6.1 UNIX® Version: Administrator's Guide," 638 pages (2001).
Leins et al., "Tivoli Storage Manager Version 3.7.3 & 4.1: Technical Guide," IBM, Redbooks, 368 pages (Sep. 2000).
Linett et al., "The Real Problems of Backup," Fourth NASA Goddard Conference on Mass Storage Systems and Technologies, College Park, Maryland, 13 pages (Mar. 28-30, 1995).
Merrill et al., "SnapVault Best Practices Guide," © 2008 NetApp, 29 pages.
Mesnier et al., "Object-Based Storage," IEEE Communications Magazine, pp. 84-90 (Aug. 2003).
Mesnier et al., "Object-Based Storage," IEEE Potentials, pp. 31-34 (Apr./May 2005).
Milligan et al., "Simplifying Management of Complex Business Operations (A Study of Mainline Storage Virtualization)," CMG 2001 Proceedings, vol. 2, 13 pages (Dec. 2-7, 2001).
Mortimer et al., "ADSM Version 3 Technical Guide," IBM, Redbooks, 384 pages (Dec. 1998).

(56) References Cited

OTHER PUBLICATIONS

Mortimer et al., "Using ADSM to Back Up Databases," IBM, Redbooks, 618 pages (Jul. 1998).
Mullender et al., "Immediate Files," Software—Practice and Experience, vol. 14, No. 4, pp. 365-368 (Apr. 1984).
Muller et al., "A High Performance Multi-Structured File System Design," ACM, pp. 56-67 (1991).
Mushran, "OCFS2: A Cluster File System for Linux: User's Guide for Release 1.4," 44 pages (Jul. 2008).
Muthitacharoen et al., "A Low-Bandwidth Network File System," ACM, 174-187 (2001).
NetApp, Inc., "Data ONTAP® 7.3 Data Protection: Online Backup and Recovery Guide," 405 pages (Jun. 2008).
NetApp, Inc., "Data ONTAP® 7.3 System Administration Guide," 349 pages (Nov. 2010).
Network Appliance Inc., "Data ONTAP 10.0: Architecture Basic Concepts Guide," 18 pages (Nov. 2006).
Network Appliance Inc., "SnapManagere 2.1 for Oracle® Installation and Administration Guide," 272 pages (Apr. 2007).
Network Appliance, Inc., "Data ONTAP™ 6.3 Command Reference," Network Appliance, Inc., Sunnyvale, California, 452 pages (Aug. 2002).
Network Appliance, Inc., "Network Appliance™ SnapMirror® Software," 2 pages (2006).
Osuna et al., "Data Protection Strategies in IBM System Storage N Series," IBM, Redbooks, 90 pages (Jun. 2008).
Osuna et al., "IBM System Storage N Series SnapMirror," IBM, Redbooks, 124 pages (Jul. 2006).
Pate et al., "Implementing SnapShot," IBM, Redbooks, 214 pages (Jul. 1999).
Pate et al., "RAMAC Virtual Array, Peer-to-Peer Remote Copy, and IXFP/SnapShot for VSE/ESA," IBM, Redbooks, 84 pages (Jan. 1999).
Pate et al., "RAMAC Virtual Array: Implementing Peer-to-Peer Remote Copy," IBM, Redbooks, 140 pages (Dec. 1998).
Patterson et al., "SnapMirror®: File System Based Asynchronous Mirroring for Disaster Recovery," Usenix Association, Proceedings of the FAST 2002 Conference on File and Storage Technologies, Monterey, California, 14 pages (Jan. 28-30, 2002).
Petition for Inter Partes Review of U.S. Pat. No. 8,299,944 Under 35 U.S.C. §§ 311-319 and 37 C.F.R. §§ 42.1-.80, 42.100-.123, 43 pages (Aug. 6, 2015).
Petition for Inter Partes Review of U.S. Pat. No. 8,788,769 Under 35 U.S.C. §§ 311-319 and 37 C.F.R. §§ 42.1-.80, 42.100-.123, 71 pages Aug. 7, 2015 (Aug. 7, 2015).
Phillips, "Zumastor Linux Storage Server," Proceedings of the Linux Symposium, vol. 2, Ottawa, Ontario, Canada, 14 pages (Jun. 27-30, 2007).
Prahlad et al., "Method for Managing SnapShots Generated by an Operating System or Other Application," U.S. Appl. No. 60/326,021, 16 pages (Sep. 28, 2001).

Quinlan et al., "Venti: A New Approach to Archival Storage," Usenix Association, Proceedings of the Fast 2002 Conference on File and Storage Technologies, Monterey, California, 14 pages (Jan. 28-30, 2002).
Sadagopan et al., "NetApp Technical Report: Oracle Fusion Middleware DR Solution Using NetApp Storage," NetApp., 38 pages (May 2008).
Sarkar, "Instant Image: Transitive and Cyclical Snapshots in Distributed Storage Volumes," Euro-Par 2000, pp. 1284-1291 (2000).
Schuettinger et al., "Helping DBAs Become More Efficient: NetApp Efficiency and Manageability Advantages," NetApp, Inc., 12 pages (Jul. 2009).
Datamonitor, "Network Appliance Adds SnapRestore, SnapMirror to OnTap," Computergram International, 2 pages (Apr. 26, 1999).
Solter et al., "OpenSolaris™ Bible," Wiley Publishing, Inc. Indianapolis, Indiana, 9 pages (2009).
Sweeney, "xFS In-core Inode Management," retrieved online <http://linux-xfs.sgi.com/projects/xfs/design_docs/>, 10 pages (Nov. 29, 1993).
Symantec Corporation, "Symantec Backup Exec Quick Recovery & Off-Host Backup Solutions for Microsoft Exchange Server 2003 & Microsoft SQL Server," 9 pages (2005).
Syncsort Incorporated, "Near-Instant Oracle Cloning with Syncsort AdvancedClient Technologies," 12 pages (2007).
Syncsort Incorporated, "Syncsort Backup Express Advanced Recovery for NetApp," 12 pages (2008).
Tate et al., "Implementing the IBM System Storage SAN Volume Controller V4.3," IBM, Redbooks, 970 pages (Oct. 2008).
Thekkath et al., "Frangipani: A Scalable Distributed File System," Proceeding SOSP '97, Proceedings of the Sixteenth ACM Symposium on Operating Systems Principles, 25 pages (1997).
Tretau et al., "IBM TotalStorage NAS Backup and Recovery Solutions," IBM, Redbooks, 226 pages (Jul. 2002).
Veritas Software Corporation, "VERITAS File System 4.1 Administrator's Guide," 270 pages (May 2005).
Veritas Software Corporation, "VERITAS FlashSnap™ Point-in-Time Copy Solutions, Administrator's Guide 4.1," 102 pages (Apr. 2006).
Veritas Software Corporation, "VERITAS NetBackup 4.5 Business Server™: Getting Started Guide," 91 pages (Mar. 2002).
Veritas Software Corporation, "VERITAS NetBackup™ 4.5 for Informix: System Administrator's Guide," 94 pages (Mar. 2002).
Veritas Software Corporation, "VERITAS NetBackup™ 4.5: User's Guide for UNIX," 212 pages (Mar. 2002).
VMware, "VMware Consolidated Backup: Best Practices and Deployment Considerations for SAN Environments," retrieved online <https://web.archive.org/web/20080804070141/http://www.vmware.com/files/pdf/vcb_best_practices>, 39 pages (2007).
Wolf, "VM Backup Bliss? The State of VM Data Protection in the Enterprise," Burton Group, Midvale, Utah, 45 pages (Aug. 1, 2007).

\* cited by examiner

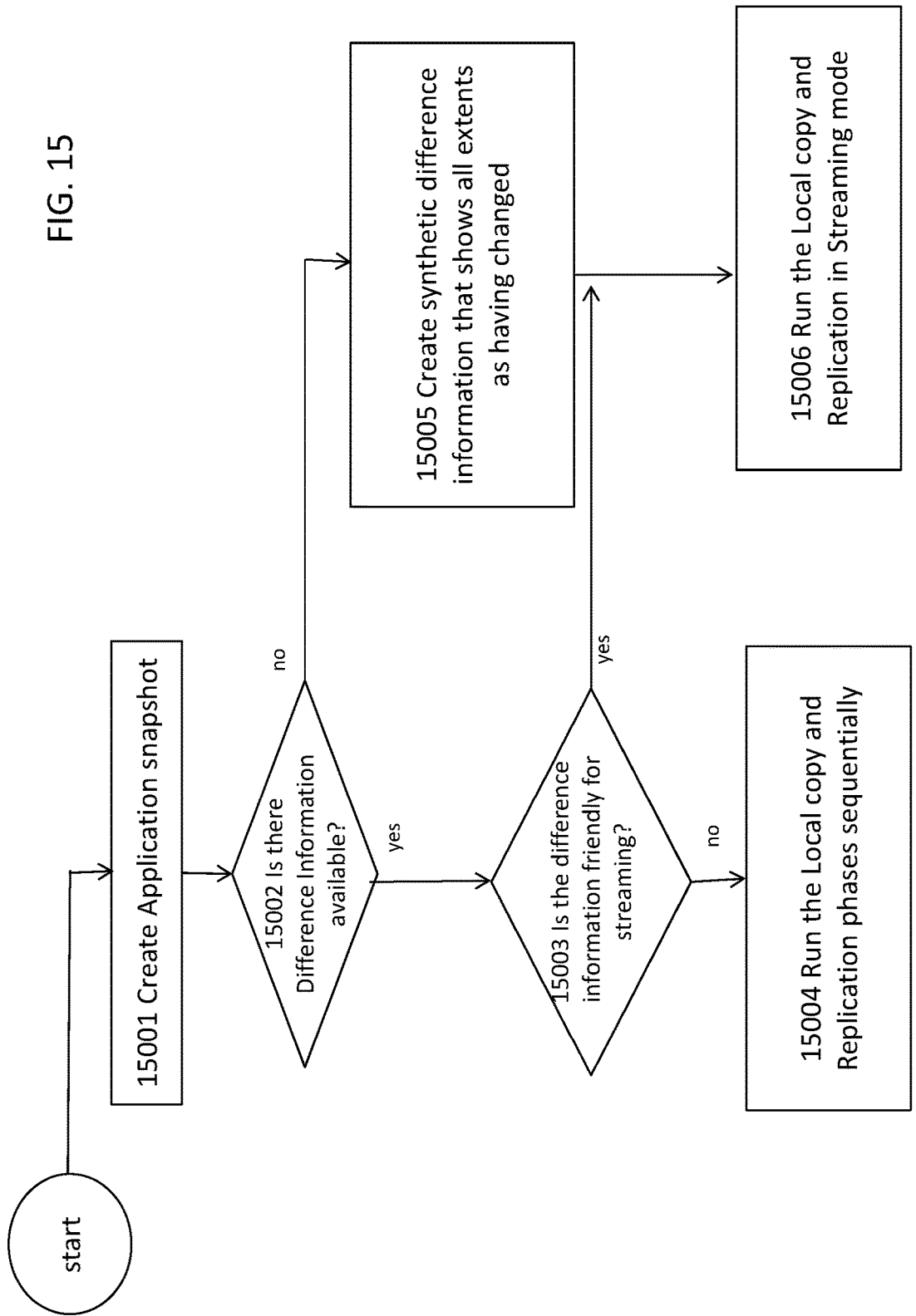

STREAMING AND SEQUENTIAL DATA REPLICATION

CROSS REFERENCE TO RELATED APPLICATIONS

This application claims priority to U.S. Provisional Application No. 62/344,662, filed on Jun. 2, 2016, entitled "STREAMING AND SEQUENTIAL DATA REPLICATION" which is incorporated herein by reference.

TECHNICAL FIELD

The present disclosure relates generally to data replication and, more particularly, to techniques for improving the process of replicating data by deciding when replication should be performed serially or in parallel with making a local copy.

BACKGROUND

Data management systems support replicating data to a remote system. The purpose of the replication is to have a copy of the data at a remote location, as a safeguard if something were to go wrong with the original location. The replication is performed by capturing a consistent image of the data to be protected at the source location, and transmitting this data to the remote location. Drawbacks of known data management systems is not accounting for changing transmission conditions and types of data received to both improve the speed of getting data transferred, and reducing the bandwidth requirements for replication.

SUMMARY OF THE INVENTION

In accordance with the disclosed subject matter, systems, methods, and non-transitory computer-readable media are provided for improving the process of replicating data by deciding when replication should be performed serially or in parallel with making a local copy. In some embodiments, systems, methods, and non-transitory computer-readable media for capturing application data locally on a source data management system and performing a high performance, bandwidth optimized replication the data from the source data management system to a remote data management system either (a) in parallel with copying data from an application to the source data management system, or (b) serially by replicating the data to the remote data management system after the data is copied to the source data management system, wherein the determination to operate in parallel or serially is based on at least one of a characteristic of the data and user specified tuning parameters. In some embodiments, a source computing device requests application data from a host where an application is running. In some embodiments, the application data comprises at least one of a full copy of the application data, and changes associated with the application data, the changes including changed elements of the application data since a previous data capture of the application data from a host, and a list of changed elements associated with the application data. In some embodiments, the source computing device receives the application data and determines a parameter associated with an ordering of the changed elements. In some embodiments, the source computing device begins to copy the application data to a location within the source computing device. In some embodiments, if the parameter is indicative of a non-overlapping order, the source computing device begins to replicate the application data to a remote computing device in parallel with copying the application data within the source computing device. In some embodiments, the source computing device and the remote computing device are connected by a network. In some embodiments, if the parameter is indicative of an overlapping order, the source computing device begins to replicate serially the application data to the remote computing device after copying the application data within the source computing device is complete.

In some embodiments, the full copy of the application data is requested when no previous captured version of the application data exists on the source computing device. In some embodiments, the full copy is automatically associated with a parameter indicating a non-overlapping order. In some embodiments, a source computing device replicates the full copy from the source computing device to the remote computing device in parallel with copying the full copy from the host to the source computing device. In some embodiments, the list of changed elements is a list of changed extents within a block device, wherein each extent describes a range of modified bytes or modified blocks. In some embodiments, replicating the application data from the source computing device to the remote computing device includes combining the extent list with each previous extent list associated with each previous data capture of the application data since a last successful replication operation. In some embodiments, the list of changed elements is a bitmap, the bitmap including bit values of zero and one to represent whether a block or a grain within the application data is associated with a changed element, the grain being associated with a number of blocks. In some embodiments, the remote computing device stores the application data alongside previously replicated application data on the remote computing device to create a complete representation of the changed application data and the previously replicated application data. In some embodiments, the source computing device replicates additional application data to the remote computing device when the remote computing device includes no previously replicated application data from the source computing device. In some embodiments, replicating the application data from the source computing device in parallel with copying the application data to the source computing device comprises: a) copying, by the source computing system, an element of changed application data from the host application to the source computing device; b) replicating, from the source computing device to the remote computing device, the element of changed application data; and repeating steps a) and b) until each element of the changed application data is copied to the source computing device and replicated to the remote computing device.

In some embodiments, a speed associated with copying each of the elements to the source computing device is substantially similar to a speed associated with replicating to the remote computing device. In some embodiments, a speed associated with replicating each of the elements to the remote data management system is substantially slower than a speed associated with copying each of the elements to the source computing device. In some embodiments, the source computing device determines when all of the application data is copied to the source computing device, stops the replication of the application data to the remote staging disk in response to determining that all of the application data is copied to the source staging disk, determines an offset associated with a data element of the application data being replicated prior to the stop, and resumes replication of the application data occurring after the offset from the location associated with the copied application data being stored in the source computing device to the remote computing device. In some embodiments, the source computing device determines a bandwidth level of the network, the bandwidth level indicative of the network being at least one of a high bandwidth network and a low bandwidth network, enables an application of deduplication and compression to the application data prior to replicating the application data to the remote computing device when the bandwidth level is indicative of the network being a low bandwidth network, and disables the application of deduplication and compression to the application data prior to replicating the application data to the remote computing device when the bandwidth level is indicative of the network being a high bandwidth network. In some embodiments, a frequency associated with the copying of the application data to a location within the source computing device is higher than a frequency associated with replicating the application data from the source computing device to the remote computing device.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 15 is a flowchart showing a process for choosing streaming versus sequential replication, according to some embodiments of the present disclosure.

DETAILED DESCRIPTION

Figure 1:
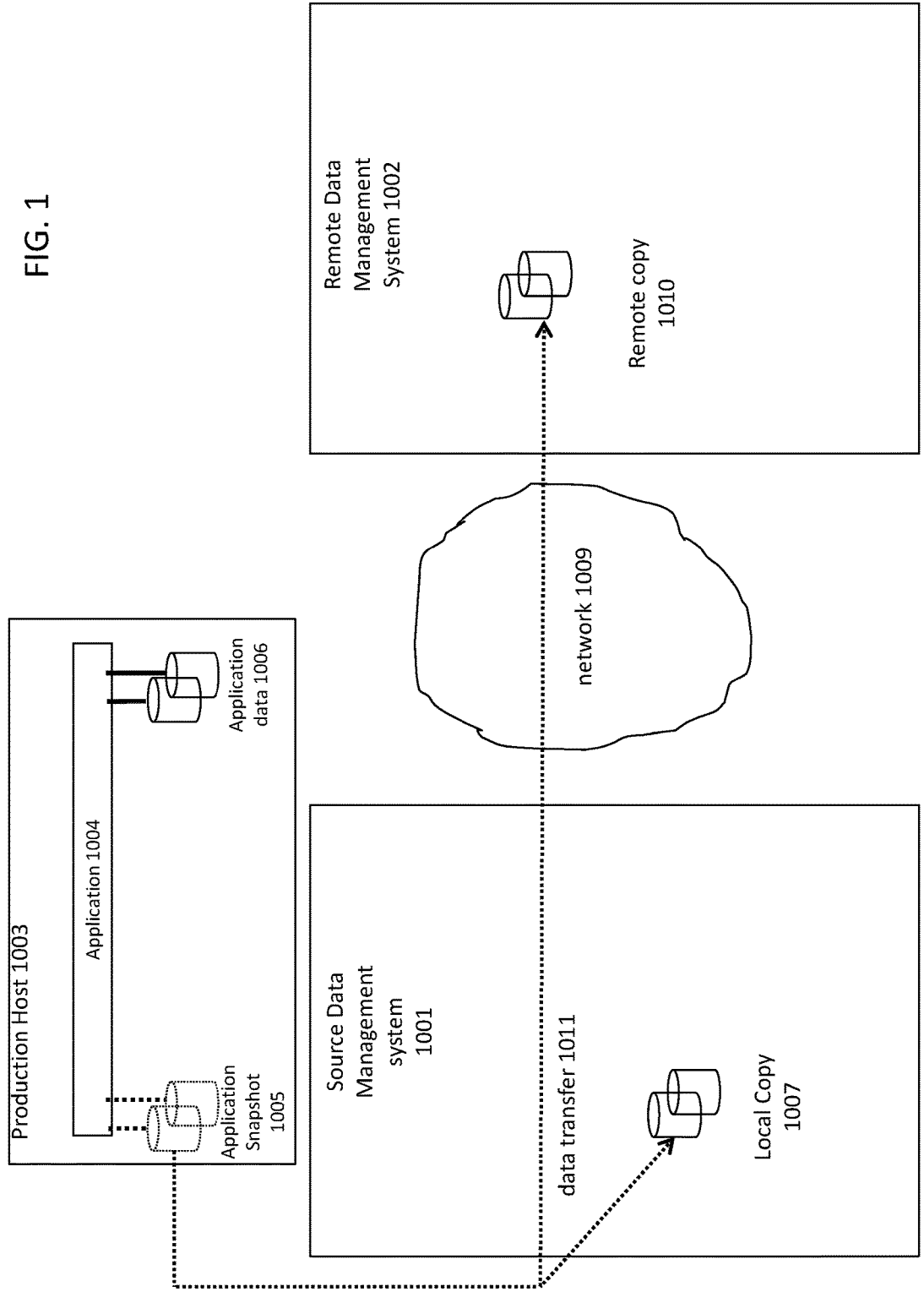
FIG. 1 is a system diagram showing the creation of a local and a remote copy of application data, according to some embodiments of the present disclosure.

With regard to getting a copy of the data to the remote location using data management systems, including advanced copy data management systems, such as the Actifio Copy Data Management System and Actifio Sky, there are competing concerns or requirements: The speed with which the data is made available at the remote location, and the bandwidth of communications required and consumed by the transfer. Optimizing one is often at the expense of the other. If you want to increase the speed with which the image of the data becomes available on the remote system, you will usually have to invest in higher quality communications infrastructure, and this has a higher cost.

Various techniques have been developed to improve the speed of getting the data transferred, and/or reducing the bandwidth requirements for replication. Data compression is one such approach, where patterns in the data are recognized, and specified in a shortened notation, so that the number of bytes required to transmit the data are reduced. Deduplication is another technique, where large blocks of identical or similar data are reduced in size by referencing previously transmitted data.

Incremental replication can be used to improve both the speed and reduce the bandwidth requirements when the data to be replicated is related to data that was transmitted at a previous time. Incremental replication identifies parts of the data that are identical to a recent, previous replication, and sends only the data that is different, along with a description of which parts have changed. The receiving side can reconstruct a complete copy of the data by combining the unchanged parts of the previous data with changes received. When only a small fraction of the data has changed as might be the case with a database application from one day to the next, this technique can provide huge gains.

Sometimes, in addition to replicating a copy of valuable data to a remote location, there is a requirement to retain a copy of the data locally, to protect against damage to the local production copy of the data, or for various other purposes.

The requirement to retain an image on the local system can introduce additional challenges to the process of replication. If the local copy is created in full first, then the data is transmitted, it delays the copy on the remote location. If the local copy and replication are done simultaneously, one can slow down the other one, complicating data capture by extending the duration that the stable image of production data has to be retained.

Systems and methods are described herein for improving the process of replicating data while maintaining a local copy, by deciding when replication should be performed serially after a local copy, or in parallel with the local copy, or even a combination, where replication begins in parallel with the local copy, but then switches to a using the local copy after that step completes. In some embodiments, making a local copy is also referred to herein as copying data to a location within the source computing device.

The techniques described here can be independent of optimization techniques such as compression, deduplication and incremental replication. It applies to all of these and other optimizations applied to the local copy and replication operations.

Systems and methods are also described herein for optimizing data replication for faster replication (also referred to herein as streaming replication) by leveraging a high network bandwidth. Replication can be run in streaming mode where replication is performed in parallel to a local backup. Alternately, replication can be run as a chained replication job that uses an existing snapshot as a source for replication and avoiding the redundant work of copying application data to staging disks and creating additional snapshots to use as a source for replication.

In some embodiments, streaming replication can bypass deduplication so as to optimize the time required to transfer the data versus the minimizing the bandwidth used. The operation creates a point in time copy of the application, and copies it to the local staging disk, and to the remote system.

In some embodiments, streaming replication can be operated in two modes—streaming and chaining. Streaming mode optimizes the time from the freezing of the application to getting the data to the remote system. Chaining allows for scheduling of the replication at a later time, based on the availability of the WAN bandwidth or to meet other goals. The ability to schedule the replication at a later time can take advantage of differential pricing of bandwidth at different times of the day, between peak and off peak hours. It can also alleviate unpredictable demand for CPU or memory in the source or remote systems. Both of these modes of operation can include some redundant operations when a local snapshot of the application is also desired in addition to the remote copy.

In streaming mode, a streaming job can create an application snapshot and copy data from application snapshot to staging disks. At the same time, the data can also be replicated in parallel being streamed to the remote system, eliminating the wait for the copy to the local staging to complete, thus completing the replication quicker. If the remote replication operation can keep pace with the local copy, the replication will complete at the same time as the local copy. If remote copy lags behind the local copy, the local copy is allowed to complete, and then the replication continues from the local staging disk. Once the local copy is complete, a checkpoint of data replicated to this point is recorded, and the ongoing replication is stopped. The data left to replicate is computed, and the replication resumes, using the freshly snapshotted staging disk as the source. Switching the replication to the snapshot of the staging disk enables the application snapshot to be deleted, minimizing time for which the snapshot is kept around.

In chaining mode, a streaming replication job runs in two separate phases. There is a local snapshot job, which takes a snapshot of the application, and copies it to the local staging disk. At a later time, when the snapshot job is complete, the replication portion of the job is started, and it uses the staging disk (or a snapshot of the staging disk) as the source for the replication. It is similar to the second phase of streaming replication, but copies all blocks changed between a previous streaming replication instance and the time of starting the latest successful local backup.

FIG. 1 is a system diagram showing the creation of a local and a remote copy of application data, according to some embodiments of the present disclosure. FIG. 1 shows a source data management system 1001, a remote data management system 1002, a production host 1003, application 1004, application snapshot 1005, application data 1006, local copy 1007, network 1009, remote copy 1010, and data transfer 1011.

The production host 1003 runs the production application 1004, which generates the application data 1006 which needs to be copied locally, and replicated to the remote location.

The Source Data Management system 1001 is the data management system close to the location of the production host; it creates and manages local copies of the application.

The remote data management system 1002 is the remote system which receives the replicated data and create the remote image.

The network 1009 connects the source data management system to the remote data management system.

The process shown in FIG. 1 creates a consistent image of application data 1006 belonging to application 1004, running on production host 1003 on the source data management system 1001 and at the remote data management system 1002. In some embodiments, the process includes taking a stable image of the application data 1006 in the form of an application snapshot 1005 and then copying this data using a data transfer mechanism 1011 to the source data management system1 1001 to create the local copy 1007 and through the network 1009 to the remote data management system 1002 to create remote copy 1010. The data transfer mechanism can include 1011 copying data over a socket or pipe using Transmission Control Protocol (TCP) or User Datagram Protocol (UDP). The data transfer can also involve having shared disks that can directly be read by the source data management system; it may also include other data transfer techniques such as Direct Memory Access, or any other technique.

Figure 2:
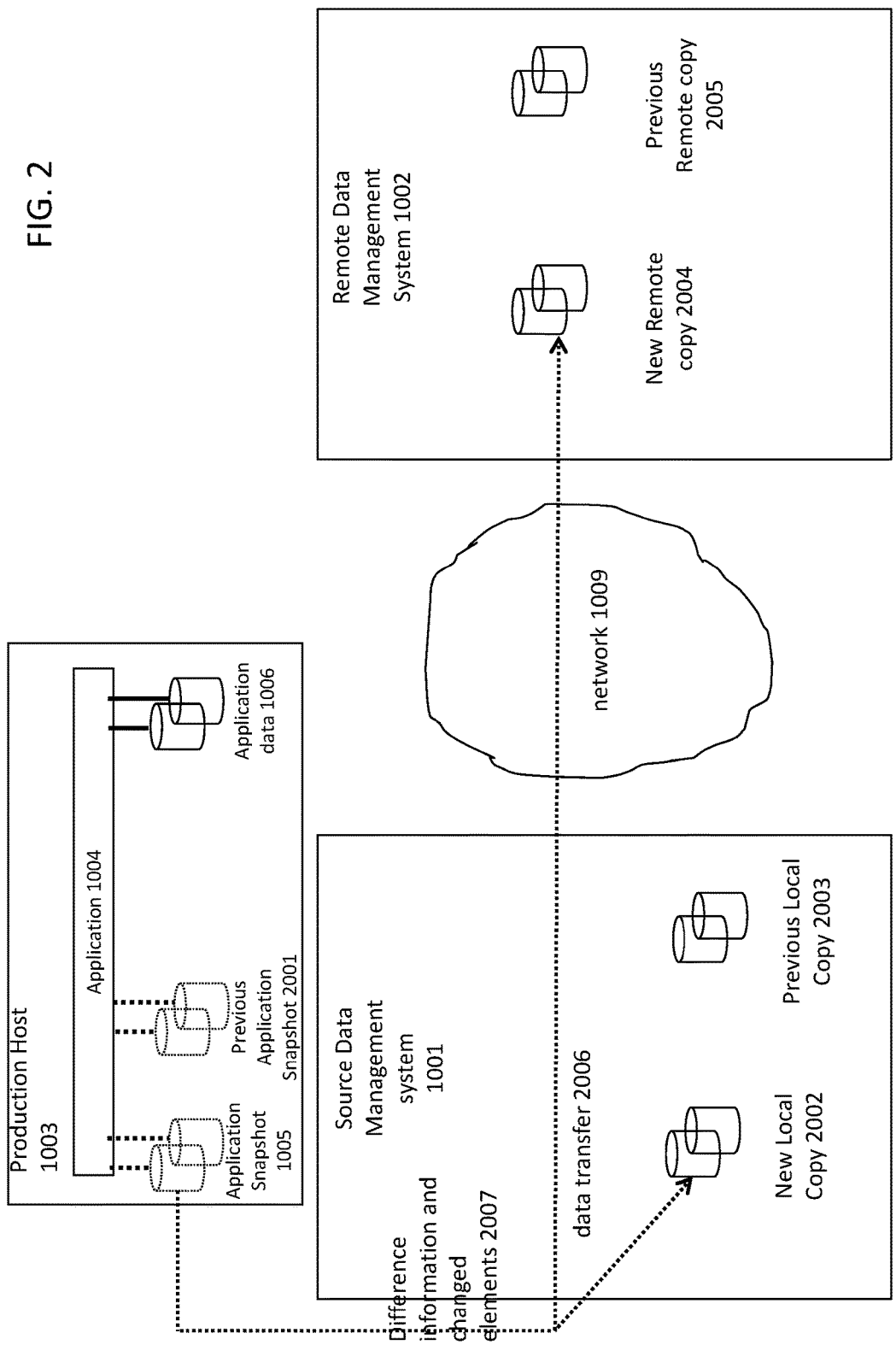
FIG. 2 is a system diagram showing an incremental local copy and replication operation, according to some embodiments of the present disclosure.

FIG. 2 is a system diagram showing an incremental local copy and replication operation, according to some embodiments of the present disclosure. FIG. 2 shows a source data management system 1001, a remote data management system 1002, a production host 1003, application 1004, application snapshot 1005, application data 1006, network 1009, previous application snapshot 2001, new local copy 2002, previous local copy 2003, new remote copy 2004, previous remote copy 2005, and data transfer 2006.

Application 1004 on production host 1003 includes application data 1006. Application data 1006 is being incrementally copied locally to the source data management system 1001 and replicated to the remote data management system 1002.

The process illustrated in FIG. 2 includes computing the difference information 2007 between the current application snapshot 1005, and the previous application snapshot 1007. In some embodiments, there does not have to be a physical copy of the previous application snapshot 1007. The snapshot 1007 existed at some point in time in the past and was used during a previous cycle of replication. The difference information can be computed from comparing snapshots, but it can also be computed by keeping track of changed blocks or changed files, or any other technique.

The combination of the difference information and the changed elements, that is, the actual data that has changed is transferred using the data transfer mechanism 2006. This changed data and difference information is then saved in the new local copy 2002 and the new remote copy 2004. Here again, the exact mechanism for saving the changed data and difference information is not material to the process. The changed data may be saved as an incremental backup; it can be converted to a synthetic full backup; it can be combined with the previous local copy 2003 in the form of two snapshots, or using any other technique.

Figure 3:
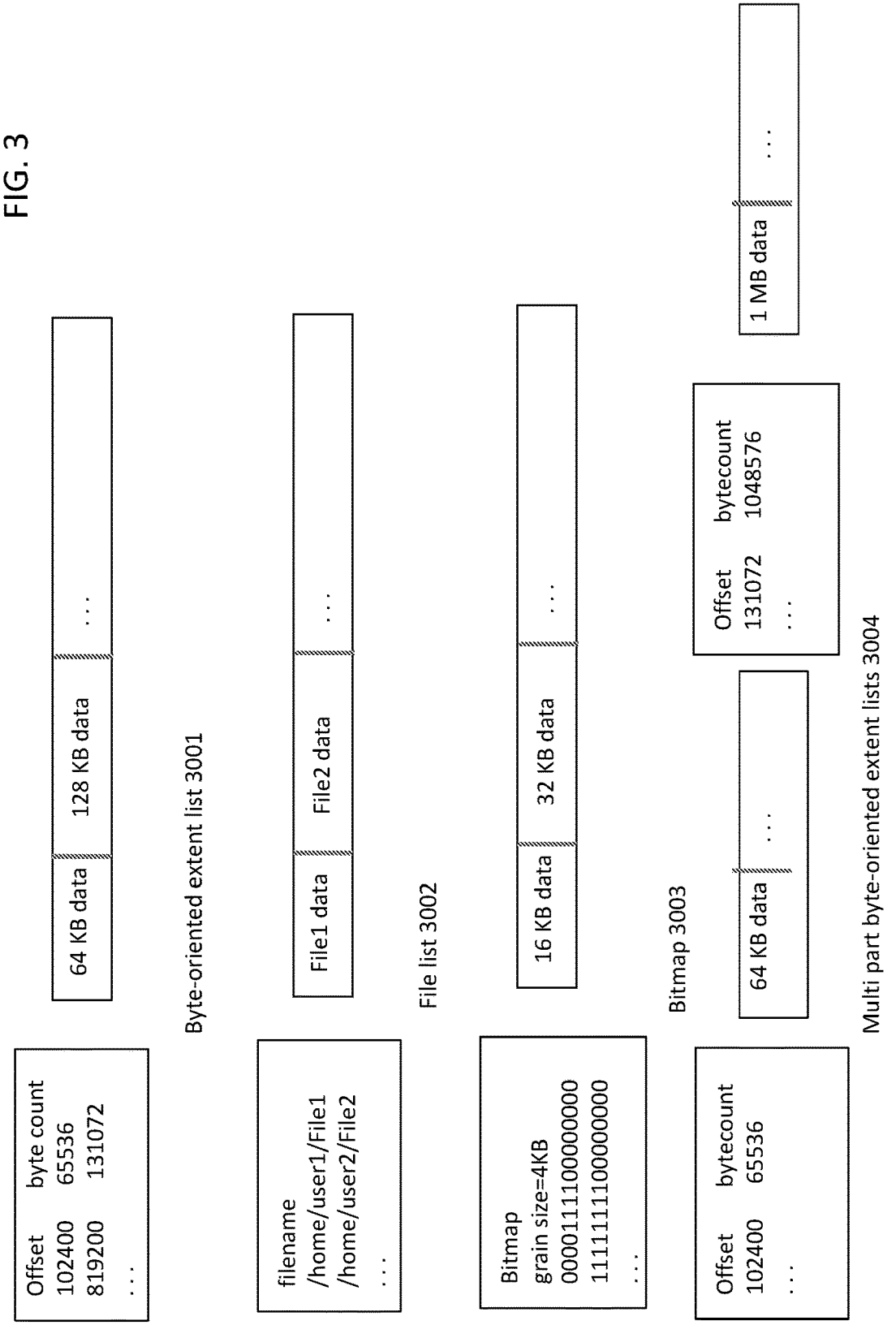
FIG. 3 is a block diagram showing representations of difference information, according to some embodiments of the present disclosure.

FIG. 3 is a block diagram showing representations of difference information, according to some embodiments of the present disclosure. FIG. 3 shows a byte-oriented extent list 3001, file list 3002, bitmap 3003, and multi part byte-oriented extent lists 3004.

3001 is a single byte-oriented list. It includes a table which contains rows of byte offsets and byte counts, which indicate the regions of an object (such as a device, logical volume or file) that have changed from one snapshot to the other. The table is followed by a string of bytes that represent the new data in those regions.

3002 is a single file list. It consists of a list of filenames which are files that have changed. The list is followed by the changed data of the files. The table may also contain file lengths, or offsets and byte counts of regions that have changed within the file.

3003 is a bitmap. The bitmap has a table with a header that describes the format of the bitmap, including at least the grain size of the bitmap. This header is followed by a string of bits that indicate which grains have changed, and which ones have not. This table is followed by the changed data itself. As used herein, a grain refers to a certain number of blocks. Generally, a bitmap is a string of bits representing the modified portions of data (e.g., volume, file, or some other quantity or organization of data). A bitmap has a granularity, where each bit represents a certain amount of data. A bit can represent a single block or a larger amount of data, such as 8 KB or 64 KB. The amount of data represented by the bit is referred to herein as the "grain-size" of the bitmap.

3004 is an example of a multi-part changed information representation. In this example, it is a multipart byte-oriented list. This form of difference information consists of a table of changed regions followed by changed data, followed by another table, then more changed data, and so on. This form allows the computation and consumption of difference information in chunks, where each of the chunks is limited in size.

Many other forms of difference information are possible. There is no requirement that difference information be ordered in any fashion in the tables. In some cases, byte oriented lists or filename lists or multipart lists may include overlaps, where a later entry in a table overlaps a previous entry in the same or an earlier table. The same file or region or an overlapping region may occur in a later table entry that had appeared in an earlier table entry. As long as the changed information is processed in the order it is represented, it will accurately describe all of the changes from the old state to the new one. In some embodiments, the format of the difference information often reflects how the difference information was tracked or collected. Some active collection techniques track every change to the monitored data and record the information by setting a bit in a bitmap in memory. The tracker can then dump the collected list of changes when requested. Other tracking techniques continuously record each of the areas changed as an extent. If the same area is changed again, at a later time, these trackers may generate an extent list where later elements may overlap earlier elements. Still other ways of generating difference information may be passive in the sense that they collect difference data only when requested, by comparing current data with older data, or comparing the signatures of current data with signatures of old data.

In some embodiments, an extent list for the replication to the remote system is created by combining all of the extent lists for each of the copies to the source computing device since the last replication was performed. For example, assume the following copy, replication, and extent list scheme:

Day 1. Local copy and replication. Extent list 1
Day 2. Local copy only. Extent list 2
Day 3. Local copy and replication. Extent list 3.

On day 3, the local copy uses extent list 3. The replication to the remote system uses a combination of extent lists 2 and 3, since the changes in extent list 2 were not replicated on day 2.

Figure 4:
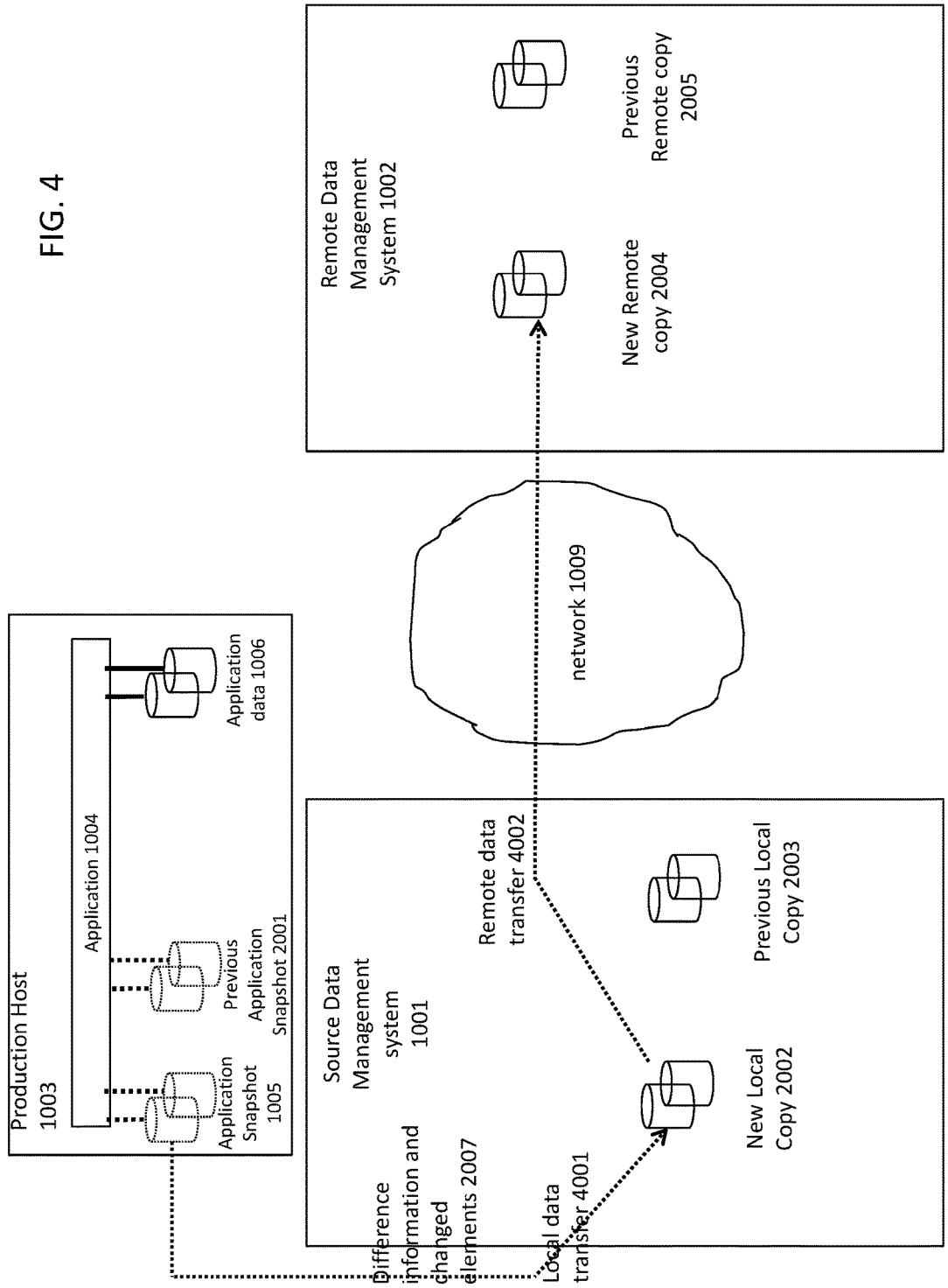
FIG. 4 is a system diagram showing an incremental local copy and replication run sequentially, according to some embodiments of the present disclosure.

FIG. 4 is a system diagram showing an incremental local copy and replication run sequentially, according to some embodiments of the present disclosure. FIG. 4 shows many of the same elements illustrated and described with respect to FIGS. 1 and 2. FIG. 4 also shows local data transfer 4001 and remote data transfer 4002.

In the process shown in FIG. 4, an incremental data copy from the host 1003 is performed to the source data management system 1001. After the incremental data copy to the source data management system 1001 is complete, an incremental replication 4002 from the source data management system 1001 is performed to the remote data management system 1002.

As described above, application 1004 on production host 1003 includes application data 1006. Application data 1006 is being incrementally copied locally to the source data management system 1001 and replicated to the remote data management system 1002.

The combination of the difference information and the changed elements 2007, is transferred using the local data transfer mechanism 4001 to create the New Local Copy 2002. Once that operation is complete, the application snapshot 1005 can be released.

Only after the new local copy 2002 is created is the remote data transfer mechanism 4002 used to transfer the difference information 2007 from the new local copy 2002 to the new remote copy 2004 through the network 1009.

The difference information 2007 is used for both the local copy and then for the remote copy operation. This is the case as long as the previous local copy 2003 and the previous remote copy 2005 are identical in content. The previous local copy 2003 and the previous remote copy 2005 are identical in content if incremental replication was carried out when the previous local copy was created. If the incremental replication was not performed or the operation failed, additional difference information can be computed between the previous remote copy 2005 and the previous local copy 2003, and this difference information can also be transferred using the remote data transfer 4002 to create the new remote copy 2004.

The process of running the local copy 2002 and the remote replication 4002 sequentially allows for the application snapshot 1005 to be released as soon as the new local copy 2002 is created. This minimizes the time for which the snapshot is held. On the other hand, the time for completing the new remote copy 2004 is delayed, because the replication cannot begin until the new local copy 2002 is completed.

Figure 5:
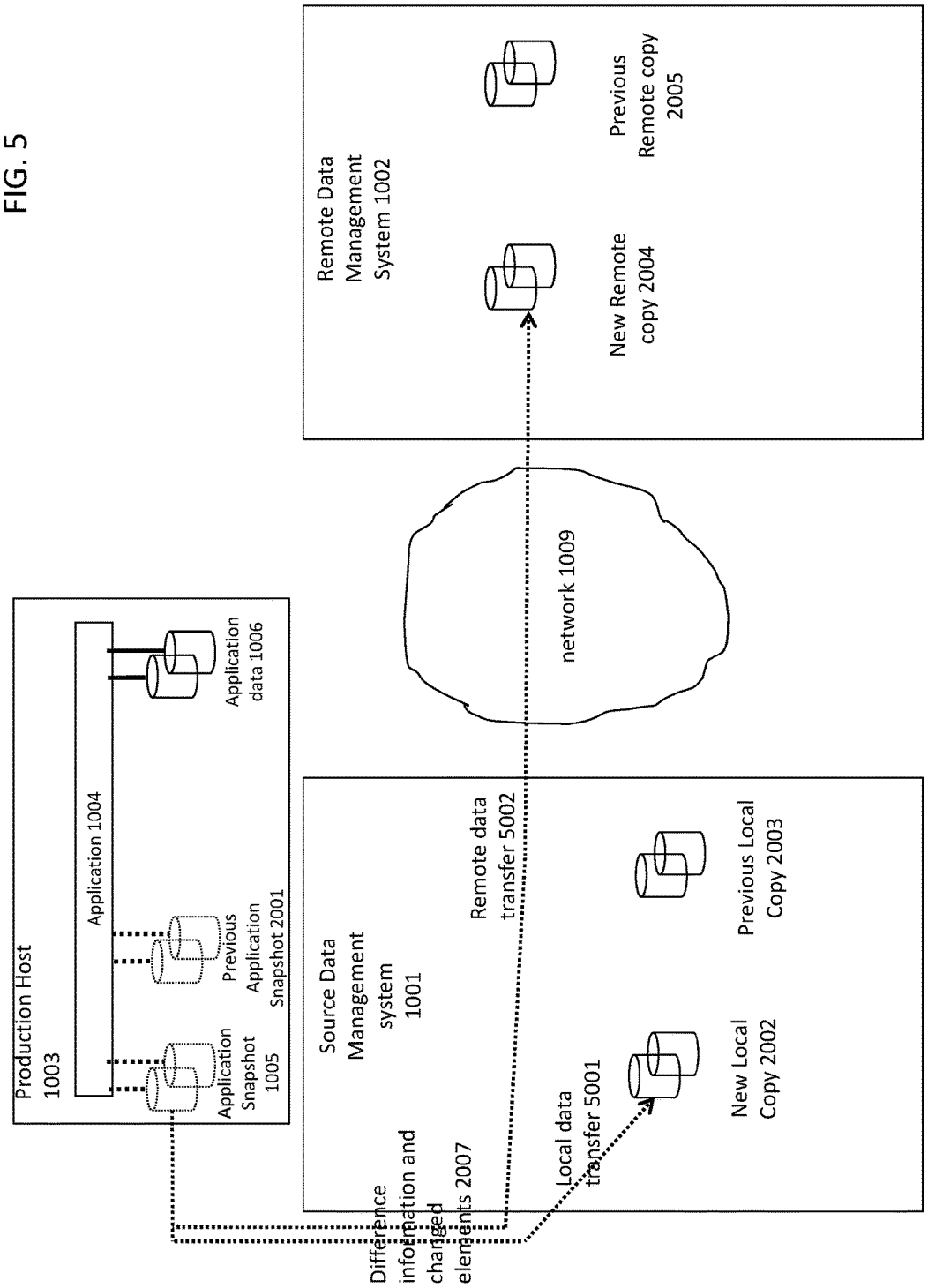
FIG. 5 is a system diagram showing an incremental local copy and replication run in parallel, according to some embodiments of the present disclosure.

FIG. 5 is a system diagram showing an incremental local copy and replication run in parallel, according to some embodiments of the present disclosure. FIG. 5 shows many of the same elements illustrated and described with respect to FIGS. 1 and 2. FIG. 5 also shows local data transfer 11001 and remote data transfer 11002.

In the process shown in FIG. 5, an incremental data copy is performed to the source data management system 1001, and at the same time, an incremental replication is performed to the remote data management system 1002.

As described above, application 1004 on production host 1003 includes application data 1006. Application data is being incrementally copied locally to the source data management system 1001 and replicated to the remote data management system 1002.

The combination of the difference information and the changed elements 2007, is transferred using the local data transfer mechanism 5001 to create the new local copy, 2002. At the same time, the difference information and changed elements 2007 are also transferred using the remote data transfer mechanism 5002 to the new remote copy 2004 over the network 1009.

After both the new local copy 2002 is completed and the new remote copy 2004 is completed, the application snapshot 1005 is released.

The process of running the local copy and the remote replication in parallel can improve the speed of the completion of the new remote copy 1013. However, the application snapshot 1005 cannot be released until the remote copy 1013 has been completed, which can take a long time, if the network is slow.

Figure 6:
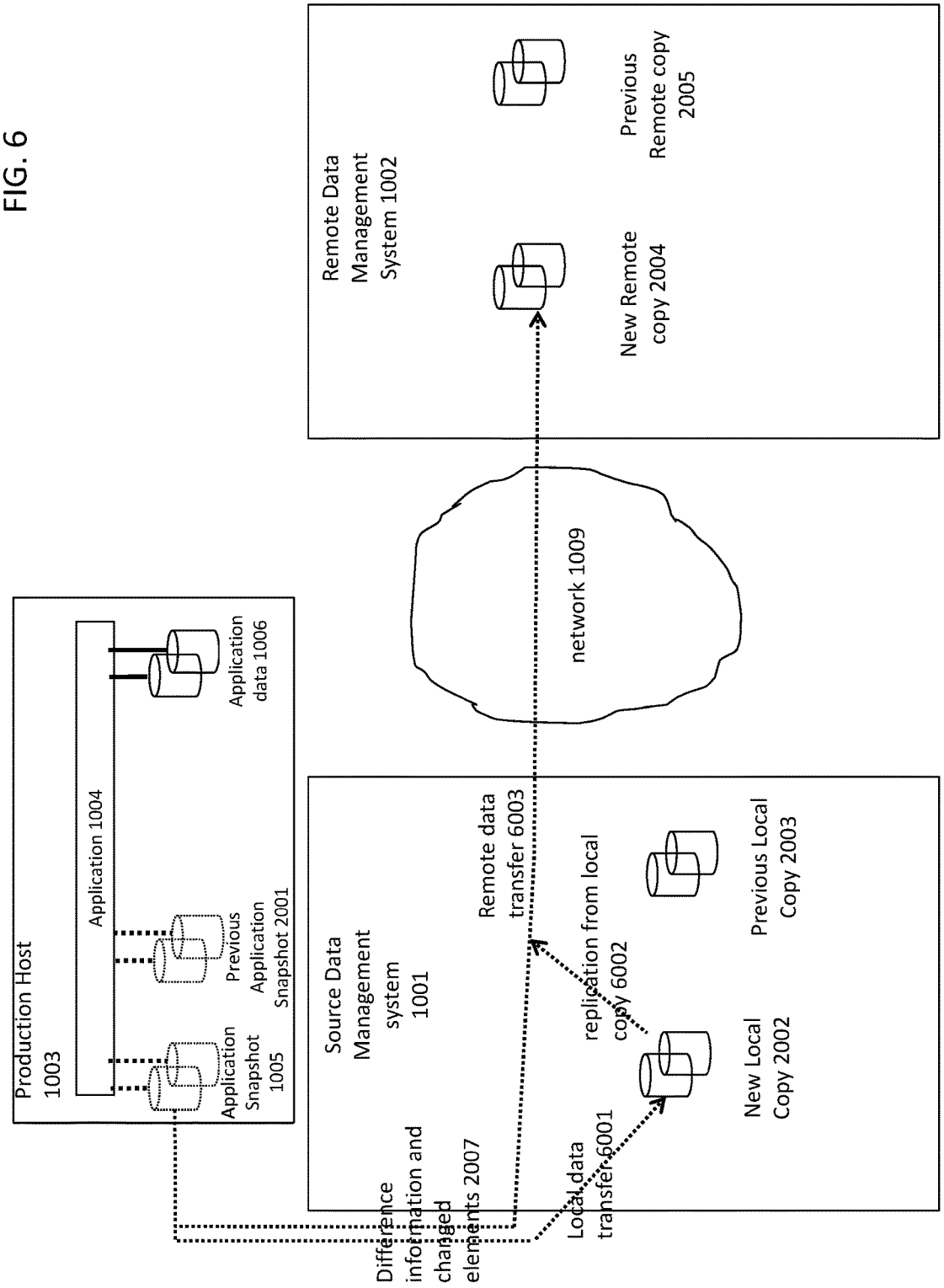
FIG. 6 is a system diagram showing an incremental local copy and replication run in parallel, according to some embodiments of the present disclosure.

FIG. 6 is a system diagram showing an incremental local copy and replication run in parallel, according to some embodiments of the present disclosure. FIG. 6 shows many of the same elements illustrated and described with respect to FIGS. 1 and 2. FIG. 6 also shows local data transfer 6001, replication from local copy 6002, and remote data transfer 6003.

In the process shown in FIG. 6, an incremental data copy 6001 is performed to the source data management system 1001, and at the same time, an incremental replication 6003 is performed to the remote data management system 1002. When the local data copy completes 6001, the incremental replication is halted and resumed from the local copy 6002.

As described above, application 1004 on production host 1003 includes application data 1006. This data is being incrementally copied locally to the source data management system 1001 and replicated to the remote data management system 1002.

The combination of the difference information and the changed elements 2007, is transferred using the local data transfer mechanism 6001 to create the New Local Copy, 2002. At the same time, the difference information and changed elements 2007 are also transferred using the remote data transfer mechanism 6003 to the new remote copy 2004 over the network 1009.

The local data transfer mechanism 6001 is usually much faster than the remote data transfer mechanism 6003, and as a result, the new local copy 2002 is complete while the new remote copy 2004 is still in progress.

When the new local copy 2002 is complete, the remote data transfer is halted, and the application snapshot 1005 is released. The remote data transfer is then resumed, but now it is using the new local copy 2002 as the source, since the application snapshot 1005 is no longer available. The data transfer from the local copy 2002 is resumed from the point in the difference information stream (also referred to herein as checkpoint) where it was halted. The replication from the local copy 2002 continues until the new remote copy 2004 has been completed.

The process of running the local copy and the remote replication in combination parallel/sequential mode has the advantages of releasing the application snapshot 1005 at the earliest possible time, and also completing the remote replication with a minimum amount of delay.

As described above, the modes of local copy and remote replication described with reference to FIG. 6 are not restricted to incremental local copy and remote replication. The same techniques can be equally applied to local copy and replication where no difference information is available, and all of the data from the application snapshot has to be copied and replicated. The techniques described above for a combined parallel/sequential mode will also be referred to herein as streaming replication.

Figure 7:
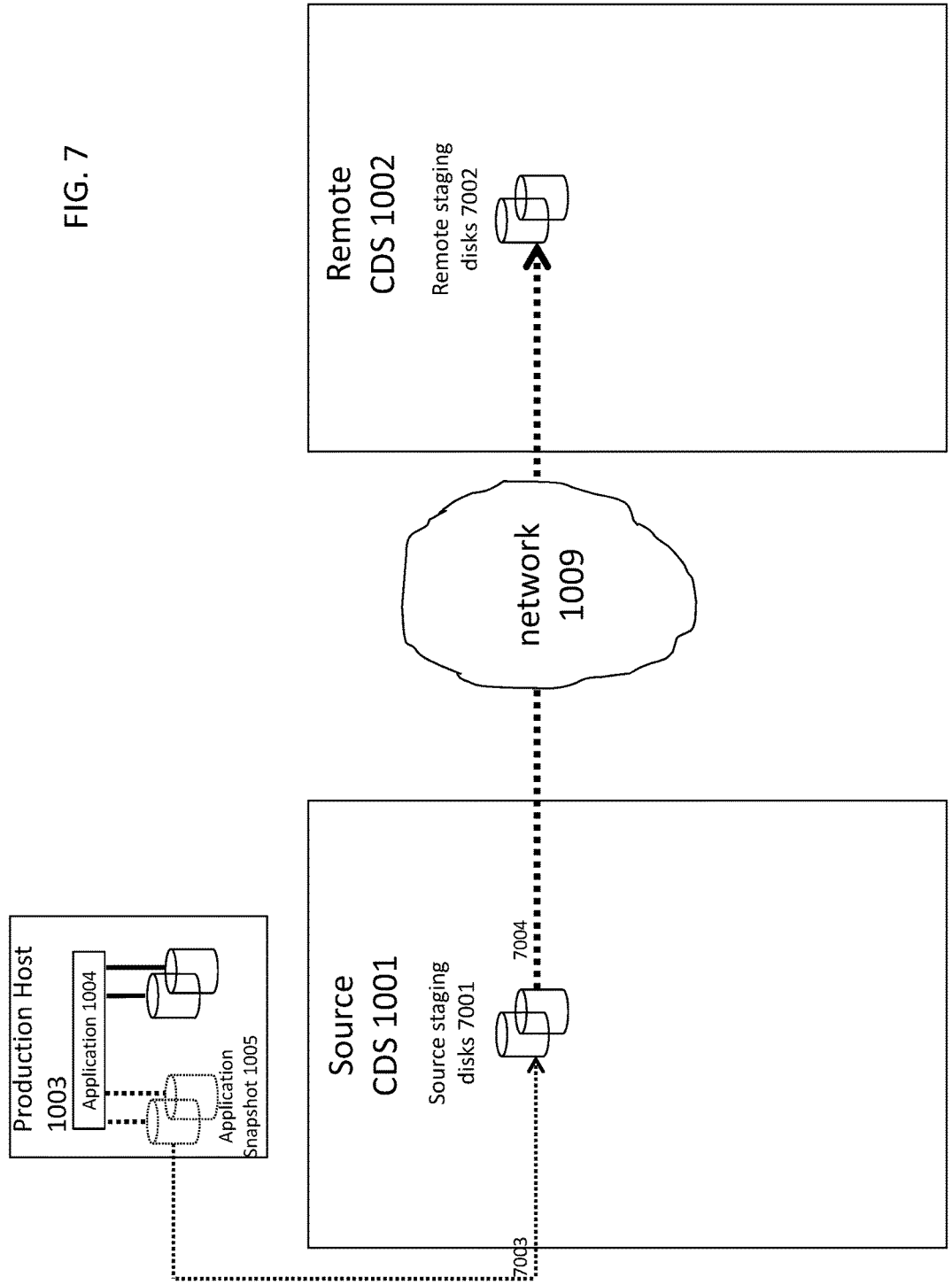
FIG. 7 is a system diagram showing in detail a first phase of streaming replication, according to some embodiments of the present disclosure.

FIG. 7 is a system diagram showing in detail a first phase of streaming replication, according to some embodiments of the present disclosure. FIG. 7 shows a source data management system 1001, a remote data management system 1002, a production host 1003, application 1004, application snapshot 1005, network 1009, source staging disks 7001, and remote staging disks 7002.

As described above, application 1004 running in production host 1003 is being protected at source data management system 1001. It is protected by a streaming replication policy to perform replication to the remote data management system 1002 connected over a network 1009. In some embodiments, the network is a high bandwidth network. In some embodiments, a streaming replication policy is one of the policies within the SLA for an application. It defines when and how frequently the application data is to be copied locally, how frequently it is to be replicated to the remote locations, and how long it is to be retained at each location. When no source staging disks exist in the source data management system 1001, the source data management system 1001, as part of a streaming replication process, first creates local staging disks 7001 that are big enough to hold the application data on source data management system 1001. Source data management system 1001 also creates remote staging disks 7002 on remote data management system 1002, if none exist. Source data management system 1001 then creates a snapshot 1005 of the source application 1004 to use as a consistent point in time for replication. In some embodiments, application snapshot 1005 can also be generated by the production host 1003. Changes to the application data that occur between snapshots are copied 7003 from the production host 1003 to the source staging disks 7001. If this is the first replication job, a full ingest 7003 is performed where all blocks are copied. While changed blocks are copied 7003 to the staging disk, these changed blocks are copied in parallel 7004 to the remote staging disks 7002. These copy operations 1006 and 1008 continue until all changed blocks are copied from source application snapshot. As referred to herein, a first pass or a first phase of replication includes steps 7003 and 7004 and ends when all of the changed blocks are copied to the local staging disks 7002. As described in more detail below, a full copy of the application data necessarily indicates that there is no overlap in an extent list associated with the full copy.

Figure 8:
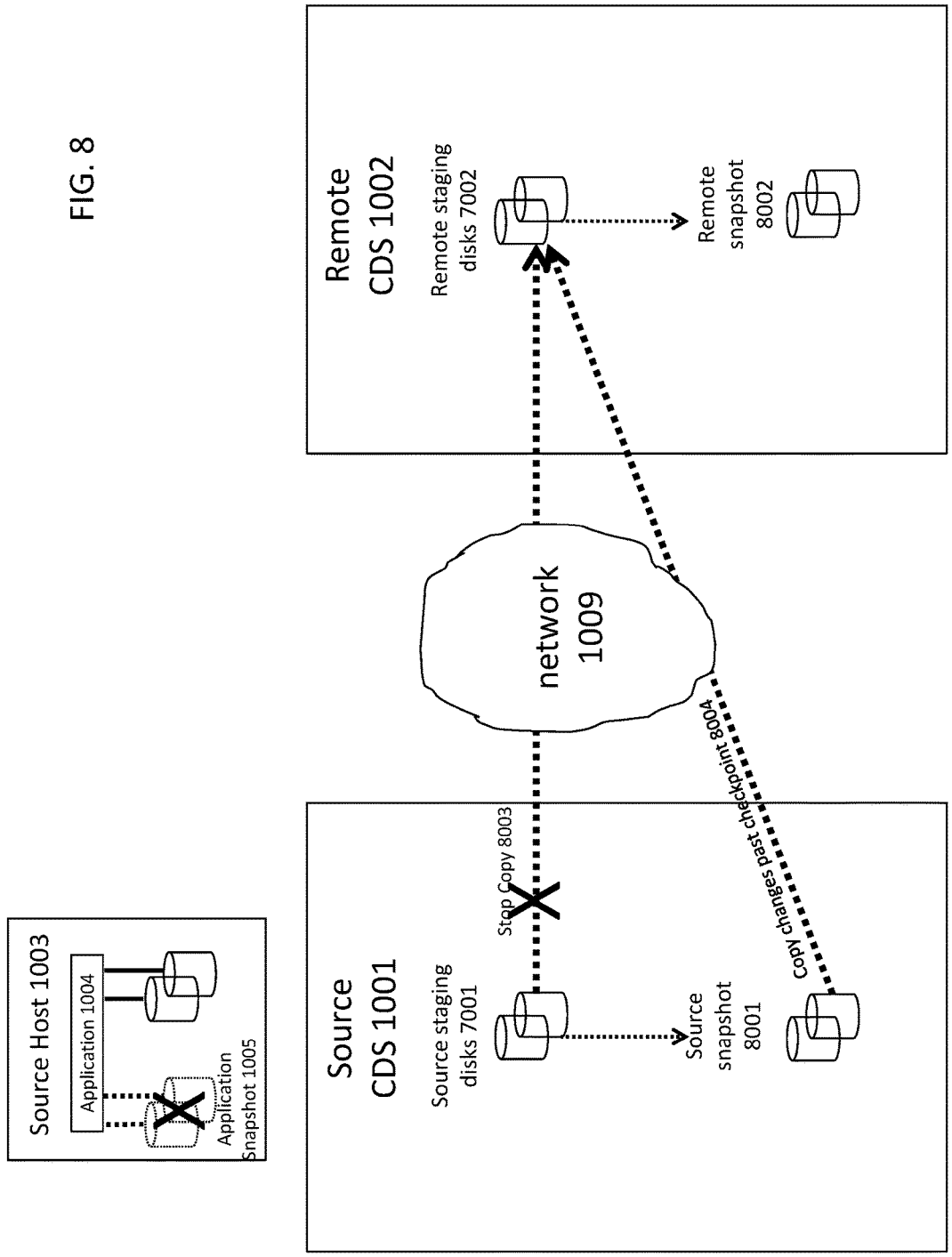
FIG. 8 is a system diagram showing in detail a second phase of streaming replication, according to some embodiments.

FIG. 8 is a system diagram showing in detail a second phase of streaming replication, according to some embodiments. FIG. 8 shows source data management system 1001, a remote data management system 1002, a production host 1003, application 1004, application snapshot 1005, network 1009, source staging disks 7001, remote staging disks 7002, source snapshot 8001, and remote snapshot 8002.

As described above, the first phase of streaming replication, as described herein, ends when all of the changed blocks are copied to the local staging disks 7001. Application specific reference information from application snapshot 1005 is first saved to obtain changed block information. After saving the application specific reference information, the application snapshot is deleted. As described above with respect to FIG. 3, the reference information can include lists or indexes indicating which portions of have changed. Next, a snapshot copy 8001 of source staging disks 7001 is created. Remote copy operation 7004 from the first phase is stopped 8003 and the last checkpoint offset is saved to record the progress of the remote copy. The checkpoint offset determines the offset from where second phase of copy should begin.

The second phase of copy is started with local snapshot copy 8001 as source and remote staging disks 7002 as target. Instead of copying all the original modified blocks, this operation only copies blocks starting from the previous checkpoint offset at the end of first phase. Once all blocks are copied to the remote staging disks, the second phase of streaming is completed. A remote snapshot copy 8002 is taken from the remote staging disks 1010 as a replication point in time reference.

Figure 9:
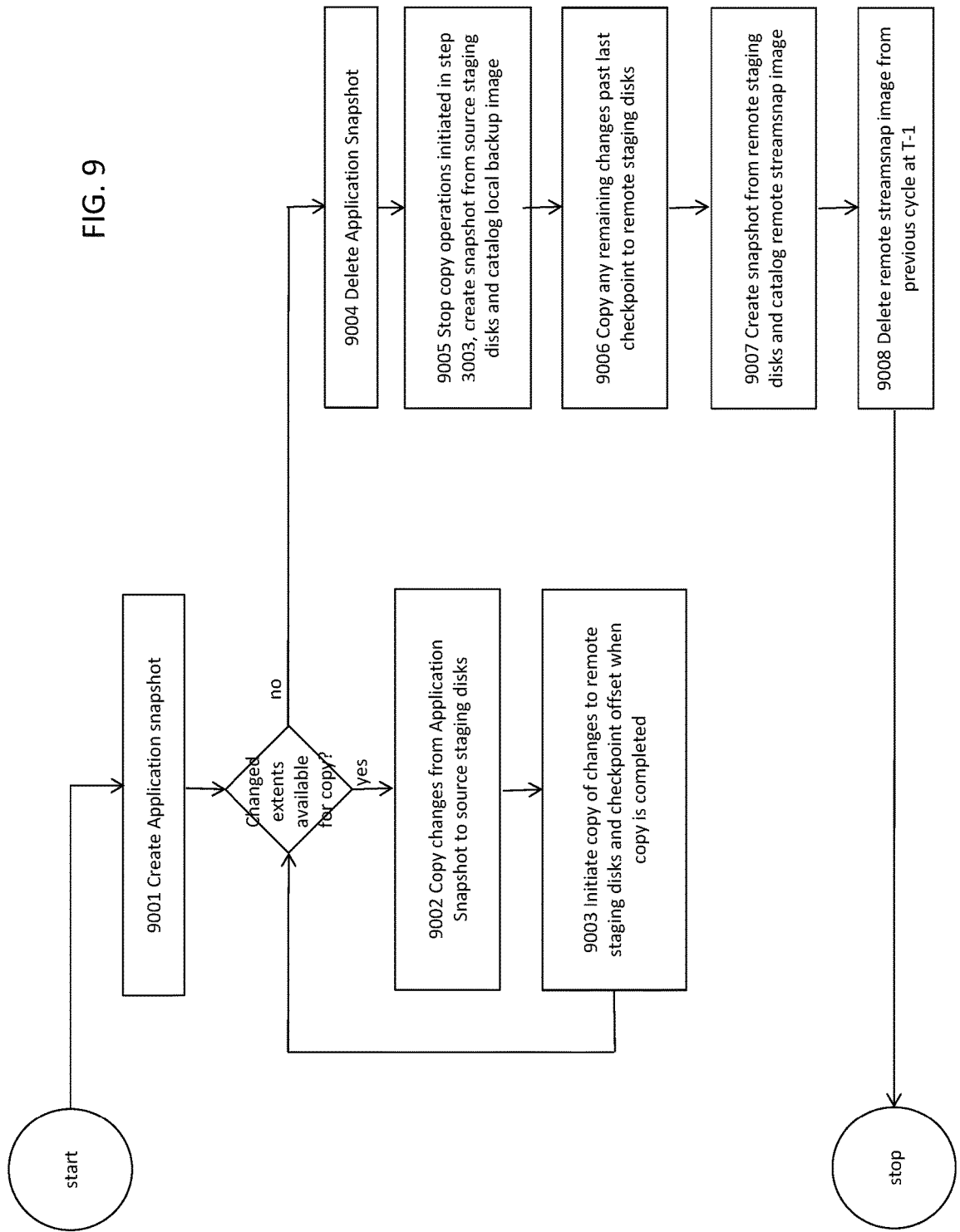
FIG. 9 is a flowchart illustrating a control flow of streaming replication run in streaming mode, according to some embodiments of the present disclosure.

FIG. 9 is a flowchart illustrating a control flow of streaming replication run in streaming mode, according to some embodiments of the present disclosure.

In step 9001, application snapshot 1005 is created for application 1004. If there are any changes in application data from previous snapshot, step 9002 copies the changed block to local staging disks. Step 9003 initiates copy the changed blocks to remote staging disks and offset of last successfully copied data block is recorded as a checkpoint. Copy operation continues to check for more changed blocks and perform steps 9002 and 9003 until all blocks are copied to the local staging disk. When there are no more blocks to be copied, step 9004 deletes the application snapshot 1005. Source data management system 1001 now creates a local snapshot 8001 in source data management system 1001 from source staging disks 7001. A local backup image is cataloged in the database that acts as a reference to these local snapshot disks for operations like restoring from this point in time image. If the remote copy operations initiated in step 9003 are not completed, they are stopped 8003. A new remote copy operation to remote staging disks 8004 is started in step 9006 that uses the local snapshot copy 8001 as source and last successful checkpoint offset from 9003 as starting offset for this new copy operation. Step 9007 creates a remote snapshot 8002 from remote staging disks 7002 and catalogs the remote image in the database that acts as a reference to this point in time at the remote data management system 1002. The remote image cataloged as part of previous streaming replication job is deleted at this point of time, as only the last successful state of the application is maintained at the remote data management system 1002.

Figure 10:
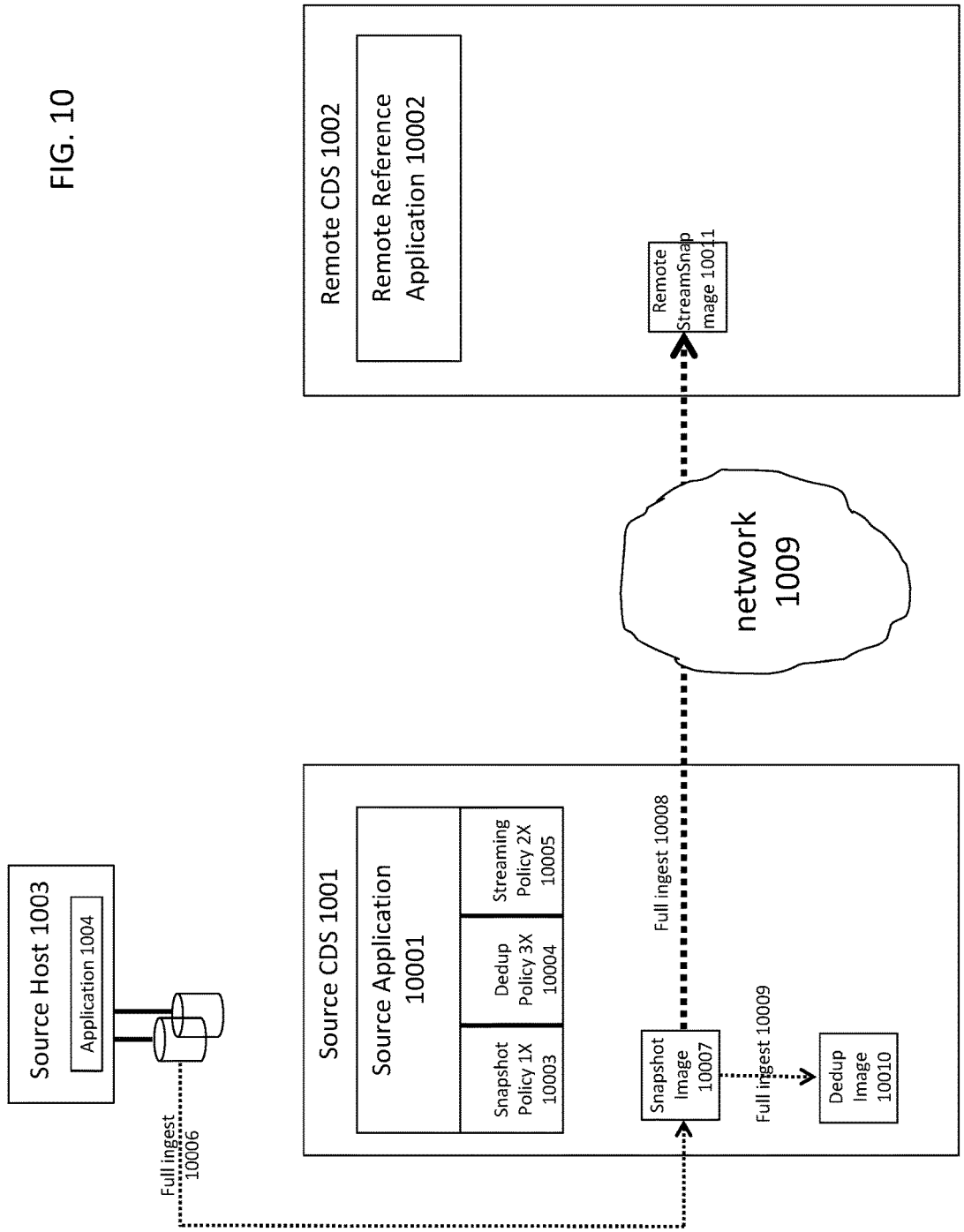
FIG. 10 is a system diagram showing a full ingest of a chained streaming replication job, as described in some embodiments of the present disclosure.

FIG. 10 is a system diagram showing a full ingest of a chained streaming replication job, as described in some embodiments of the present disclosure. FIG. 10 shows source data management system 1001, a remote data management system 1002, a production host 1003, application 1004, network 1009, source application 10001, remote reference application 10002, snapshot policy 10003, dedup policy 10004, streaming policy 10005, snapshot image 10007, dedup image 10010, and remote image 10011.

Application 1004 running in source host 1003 is being protected at source data management system 1001 in a similar manner as described with respect to FIG. 7. The protected version of the application within data management system 1001 is referred to herein as source application 10001. Source application 10001 is protected using various policies that adhere to the service level agreement for protecting this application, as described above. Snapshot policy 10003 is associated with snapshotting the application 1004 at periodic intervals. As described above, the first job includes performing a full ingest 10006 that copies all blocks of source application into data management system 1001, and a snapshot image 10007 is created that references the point in time image of the source application. Dedup policy 10004 is associated with periodically deduplicating snapshots created in the previous step and the corresponding compressed objects are cataloged as dedup images. As part of the first replication, the dedup policy specifies copying 10009 the snapshot image 10007 of the full ingest into dedup store and catalogs the resulting dedup objects as dedup image 10010. Streaming policy 10005 is associated with periodically transferring the snapshot created by snapshot policy to the replication target data management system 1002. The first streaming replication job performs a full ingest that copies all blocks of the local snapshot image 10007 and catalogs the remote images as 10011 that points to the remote copies. A remote reference application 10002 provides a record of remote images corresponding to the incoming replicated data.

Figure 11:
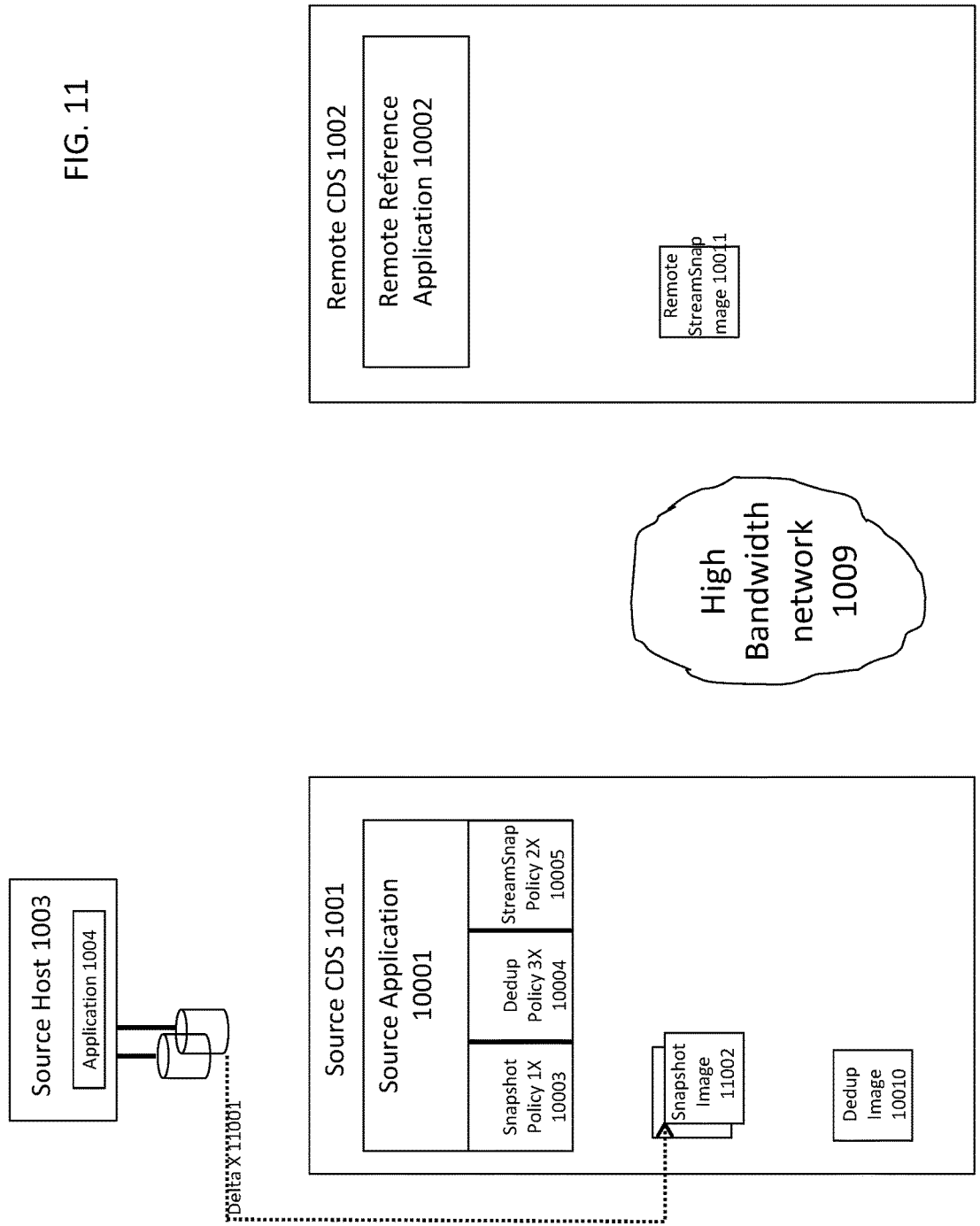
FIG. 11 is a system diagram showing a first incremental snapshot operation of a chained streaming replication job, as described in some embodiments of the present disclosure.

FIG. 11 is a system diagram showing a first incremental snapshot operation of a chained streaming replication job, as described in some embodiments of the present disclosure. FIG. 11 shows source data management system 1001, a remote data management system 1002, a production host 1003, application 1004, network 1009, source application 10001, remote reference application 10002, snapshot policy 10003, dedup policy 10004, streaming policy 10005, dedup image 10010, remote image 10011, delta x 11001, and snapshot image 11002.

As described above, snapshot policy 10003 ensures that snapshots are periodically run for application 10001. When it is time to run the next snapshot job after the first full ingest, source data management system 1001 calculates the changed blocks from previous snapshot job. Resulting changed blocks, referenced as Delta X 11001, are copied to source data management system 1001 and a new snapshot image 11002 is cataloged that references the new state of the application at the time of running the incremental snapshot job.

Figure 12:
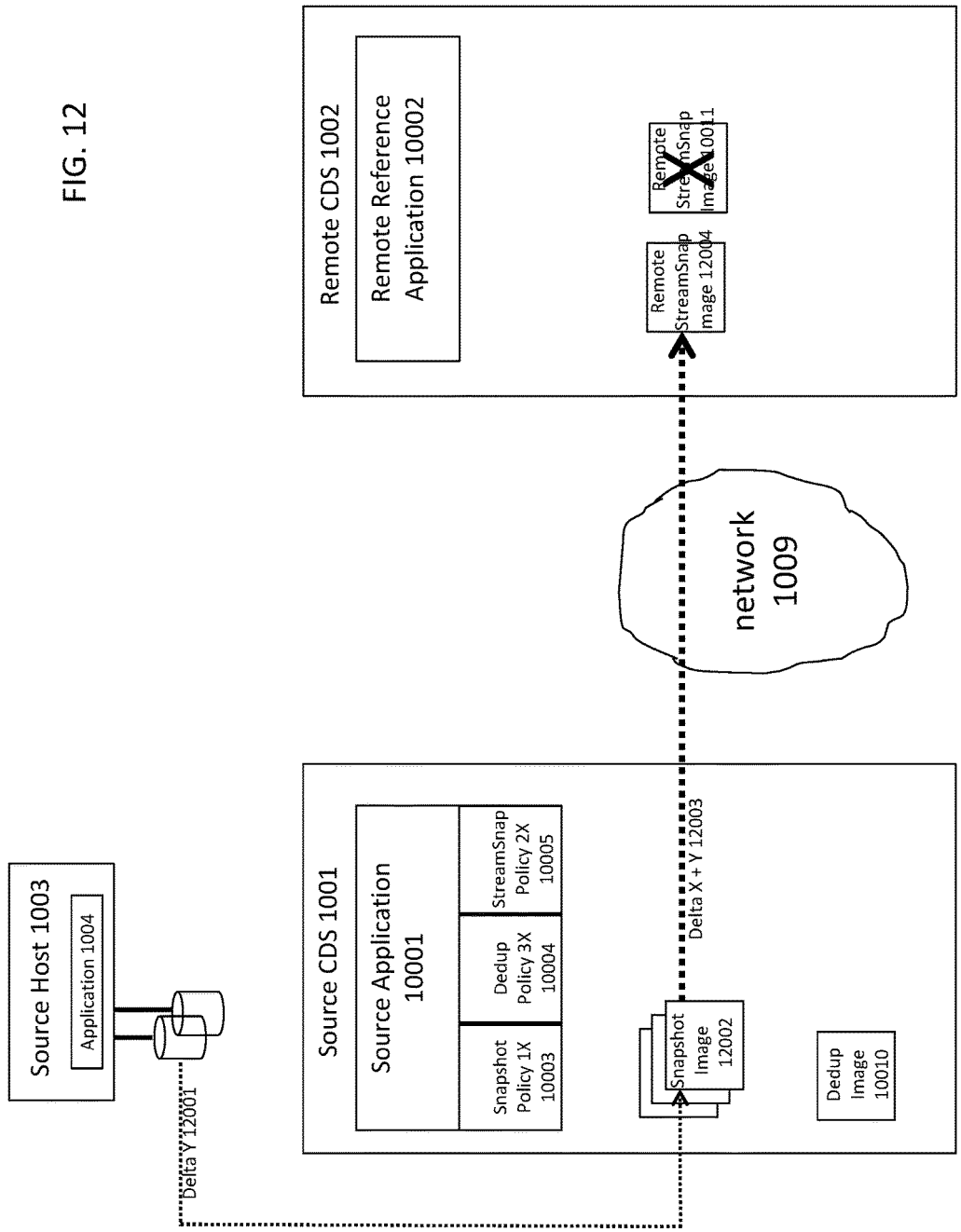
FIG. 12 is a system diagram showing an incremental operation of a chained streaming replication job including snapshot and streaming operations, as described in some embodiments of the present disclosure.

FIG. 12 is a system diagram showing an incremental operation of a chained streaming replication job including snapshot and streaming operations, as described in some embodiments of the present disclosure. FIG. 12 shows source data management system 1001, a remote data management system 1002, a production host 1003, application 1004, network 1009, source application 10001, remote reference application 10002, snapshot policy 10003, dedup policy 10004, streaming policy 10005, dedup image 10010, remote image 10011, delta y 12001, delta x+y 12003, and snapshot image 12004.

As described above, streaming policy 10005 ensures that application data is periodically transferred to the remote data management system 1002. When it is time to perform an incremental snapshot and also replicate it to the remote data management system, a snapshot is performed similar to the first incremental snapshot described above. Source data management system 1001 copies the new changed blocks, referenced as Delta Y 12001 to data management system 1001 and a new snapshot image 12002 is cataloged. A streaming job scheduled at this point of time uses the latest snapshot image 12002 as a source for copying. All of the changed blocks between the previous streaming job and current job, referenced as Delta X+Y 12003, are copied to remote data management system 1002. When the copy operation is complete, a new image 12004 is cataloged that references the newly copies remote objects. Previous image 10011 is now deleted form the remote data management system 1002, as only the latest point in time image of the application is maintained at the remote data management system 1002.

Figure 13:
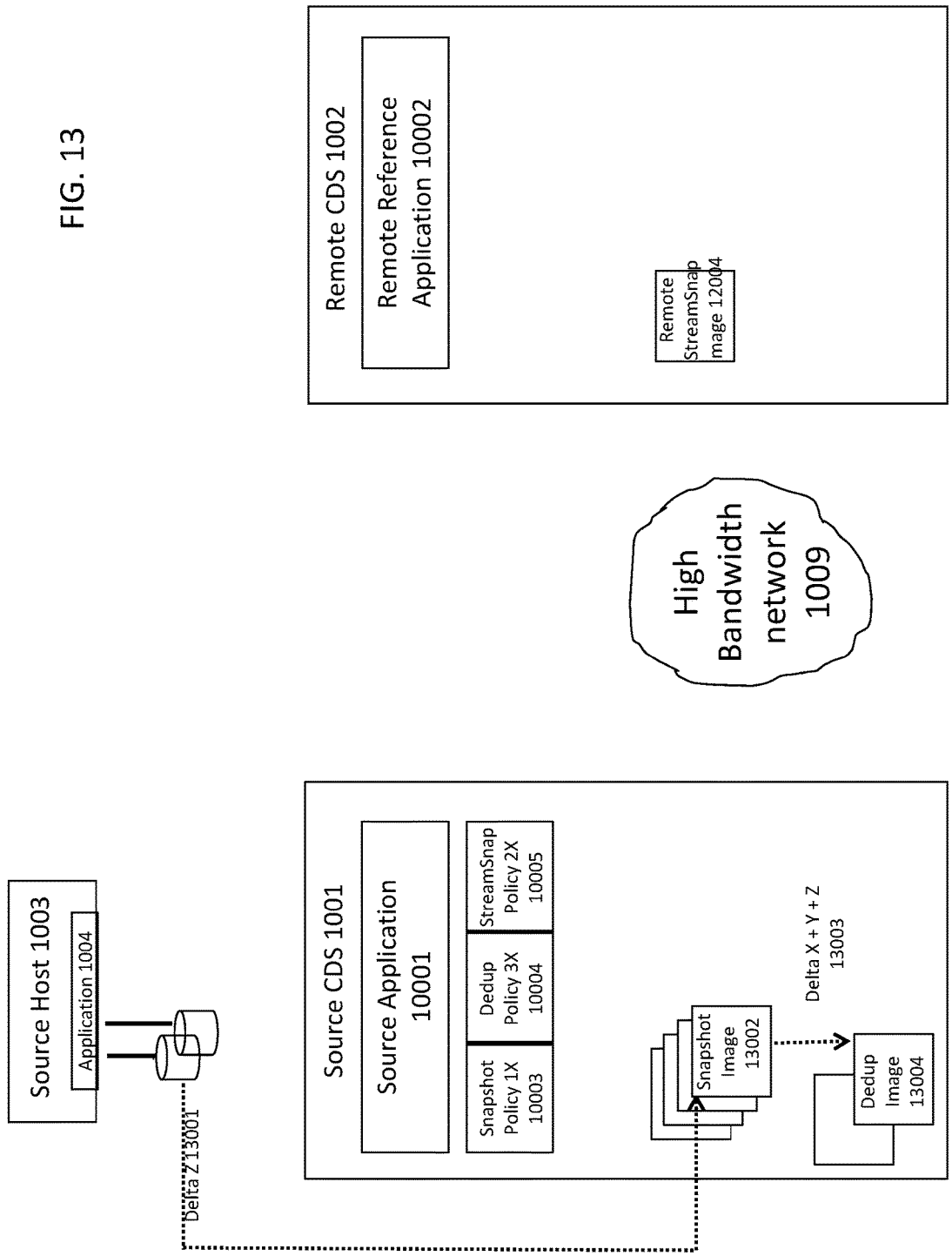
FIG. 13 is a system diagram showing an incremental operation of a chained streaming replication job including snapshot and deduplication operations, as described in some embodiments of the present disclosure.

FIG. 13 is a system diagram showing an incremental operation of a chained streaming replication job including snapshot and dedup operations, as described in some embodiments of the present disclosure. FIG. 13 shows source data management system 1001, a remote data management system 1002, a production host 1003, application 1004, network 1009, source application 10001, remote reference application 10002, snapshot policy 10003, dedup policy 10004, streaming policy 10005, delta z 13001, snapshot image 13002, delta x+y+z 13003, and dedup image 13004.

As described above, dedup policy 4004 ensures that application data is periodically transferred to the local dedup store on source data management system 1001. When it is time to perform an incremental snapshot and also deduplicate it, a new snapshot image 13002 is created by a copy operation that captures the changed blocks referenced as Delta Z 13001 from application. All changed blocks between the previous dedup operation and the current one, referenced as Delta X+Y+Z 13003, are copied to the dedup store and a dedup image 13004 is cataloged as a reference.

Figure 14:
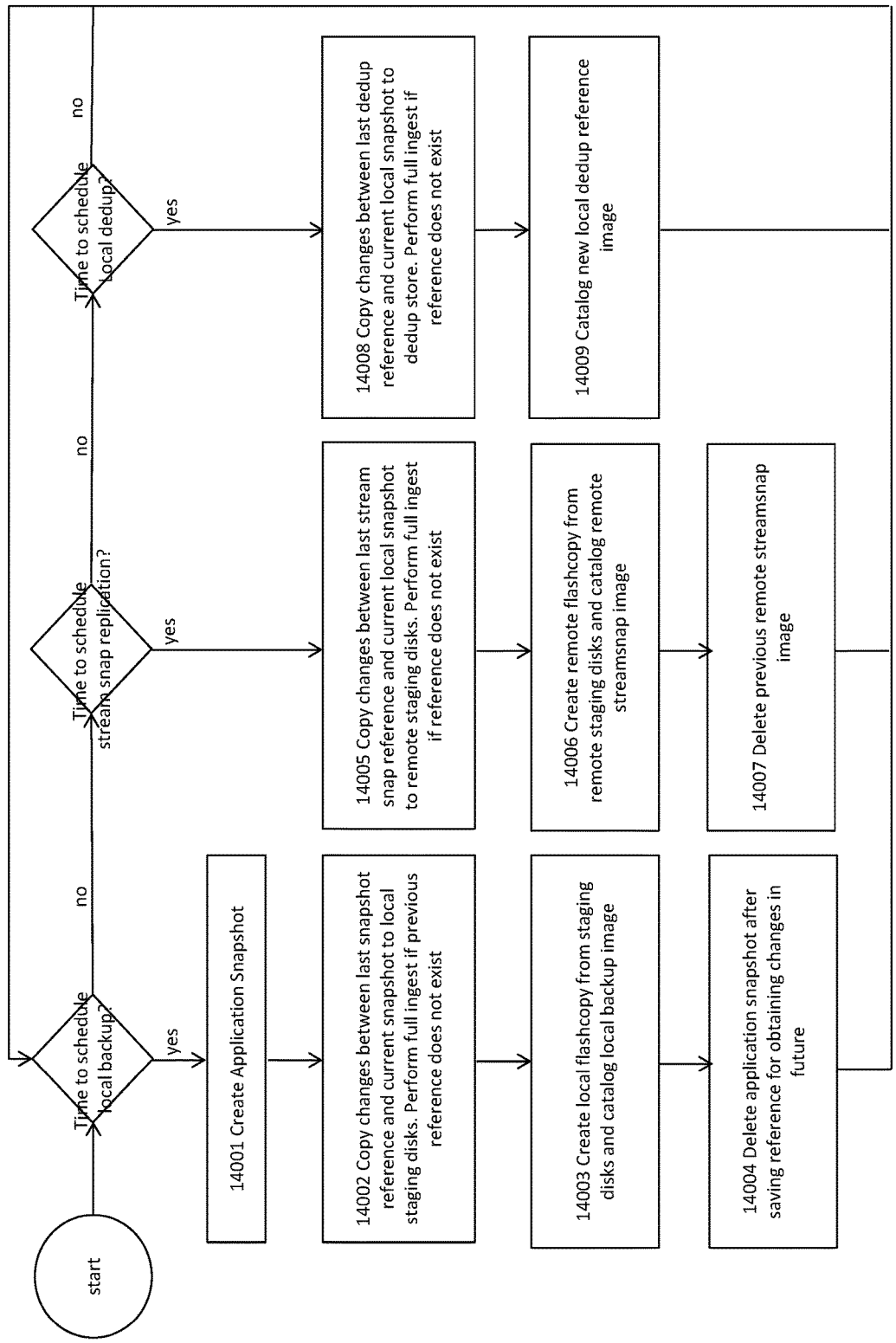
FIG. 14 is a flowchart illustrating a chained job including snapshot, deduplication and streaming replication policies, according to some embodiments of the present disclosure.

FIG. 14 is a flowchart illustrating a chained job including snapshot, dedup and streaming replication policies, according to some embodiments of the present disclosure.

When it is time to schedule a local backup, step 14001 creates an application snapshot. In step 14002, all changes from application are copied to local staging disks. If it is the first snapshot, a full ingest is performed where are blocks of application data are copied to local disks on source data management system 1001. When the copy is complete, step 14003 creates local copies and catalogs a local backup image in the database that acts as a reference to the local copies. Application snapshot created in step 14001 is now deleted after saving a reference to it for use in future jobs for obtaining changed block information.

When it is time to perform a streaming replication, step 14005 picks the last successful snapshot as source. It calculates the changed blocks between a previous image and the latest snapshot and all the changed blocks are copied to remote staging disks. If this is the first job, all blocks are copied from local snapshot to the remote staging disks. At the end of the copy, step 14006 creates remote copies from the remote staging disks and catalogs the remote image in the database that acts as a reference to the point in time of the application on remote data management system 1002. In step 14007, previous image is deleted if this is not the first streaming job for this application.

When it is time to perform a dedup copy, step 14008 picks the latest local snapshot as source. It calculates the changed blocks between the previous dedup image and the latest snapshot and all the changed blocks are copied to the dedup store. If this is the first dedup job, all blocks are copied from local snapshot to the dedup store. At the end of the copy, step 14009 creates local dedup objects and catalogs local dedup image in the database that acts as a reference to the point in time of the application in the dedup store.

FIG. 15 is a flowchart showing a process for choosing streaming versus sequential replication, according to some embodiments of the present disclosure.

Step 15001 creates a snapshot of the application, and computes difference information between the current snapshot and any previous snapshots.

Step 15002 makes a decision on whether difference information is available. If none is available, the system behaves as though there is a single extent list where all extents have changed (step 15005), and the system proceeds with replication in streaming mode, step 15006.

If there is difference information available, then there is a determination in step 15003 whether the difference information is organized in such a way that streaming replication is advantageous (also referred to herein as being friendly to streaming replication). If it is determined that the difference information is streaming friendly, the system proceeds with streaming replication, step 15006.

If it is determined that the difference information is not friendly to streaming, then the system proceeds with running the local copy and replication as sequential operations, step 15004.

Difference information is considered to be friendly to stream under these conditions:
- It is known that the difference information is strongly ordered. For example, difference information is strongly ordered when it is identified that one changed extent is before or after any other changed extent.
- It is known that changed extents that come later do not overlap with changed extents that come earlier in the ordered list of extents. Overlapping is defined as the two extents include the same part of an object, and include different changed data.

In some embodiments, if either of these conditions is not satisfied (or cannot be determined authoritatively), then the difference information is not friendly to streaming replication.

In some embodiments, and as described above, a decision to replicate data from a source device to a remote device in parallel or serially with copying the data to a location within the source device can depend on a parameter associated with an ordering of the changed extents or elements. The parameter can indicate whether the ordering of changed elements in the application data is overlapping or non-overlapping.

In some embodiments, data can be replicated in parallel with copying of the data when the list is overlapping. In some embodiments, this involves sorting and combining overlapping entries in the extent list so the extent list no longer contains overlapping entries, and then can be processed in parallel. In situations where the whole extent list is not available up front, the source device can sort as much of the extent list as is available, process that portion in parallel, then obtain the next chunk of extents, sort and process in parallel, etc.

In some embodiments, compression and/or deduplication can be applied to the application data by a source device prior to sending the application data to a remote device. The source device can determine when to apply deduplication and/or compression based on network conditions, including latency and bandwidth of the communications between the local and remote systems. In some embodiments, the replication of application data is done directly by sending data from the source computing device to the remote copying device without deduplicating and compressing the data to take advantage of high bandwidth networks, and application data is deduplicated and compressed before sending to the remote system to optimize the replication for low bandwidth networks. Bandwidth can be determined by sending a known amount of data, and measuring the time taken, so as to compute the number of bytes per second that the network can sustain. High bandwidth is when the bandwidth of the network is a large fraction of the rate at which data can be written to a location on the source device. When there is high bandwidth, the time taken to replicate the data is similar to the time taken to replicate the data to the remote system. Low bandwidth is when the rate of transfer of data across the network is substantially slower than the rate of storing the data in another location on the source system. The time taken to complete the replication is substantially more than the time to make a local copy. In this environment, the user is willing to expend memory and CPU resources to perform deduplication and compression to attempt to speed up the replication to the remote system.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method of capturing application data locally on a source data management system and performing a high performance, bandwidth optimized replication the data from the source data management system to a remote data management system either (a) in parallel with copying data from an application to the source data management system, or (b) serially by replicating the data to the remote data management system after the data is copied to the source data management system, wherein the determination to operate in parallel or serially is based on at least one of a characteristic of the data and user specified tuning parameters, the method comprising:
  requesting, at a source computing device, application data from a host where an application is running, the application data comprising at least one of:
    a full copy of the application data, and
    changes associated with the application data, the changes including changed elements of the application data since a previous data capture of the application data from a host, and a list of changed elements associated with the application data;
  receiving, by the source computing device, the application data;
  determining, by the source computing device, a parameter associated with an ordering of the changed elements;
  beginning to copy, by the source computing device, the application data to a location within the source computing device;
  if the parameter is indicative of a non-overlapping order, beginning to replicate, by the source computing device, the application data to a remote computing device in parallel with copying the application data within the source computing device, the source computing device and the remote computing device being connected by a network; and
  if the parameter is indicative of an overlapping order, beginning to replicate serially, by the source computing device, the application data to the remote computing device after copying the application data within the source computing device is complete,
  thereby copying application data to a source data management system and replicating the application data from a source data management system to a remote data management system serially or in parallel based on at least one of a characteristic of the data and user specified tuning parameters.

2. The computerized method of claim 1, wherein the full copy of the application data is requested when no previous captured version of the application data exists on the source computing device.

3. The computerized method of claim 2, wherein the full copy is automatically associated with a parameter indicating a non-overlapping order, the computerized method further comprising replicating the full copy from the source computing device to the remote computing device in parallel with copying the full copy from the host to the source computing device.

4. The computerized method of claim 1, wherein the list of changed elements is a list of changed extents within a block device, wherein each extent describes a range of modified bytes or modified blocks.

5. The computerized method of claim 4, wherein replicating the application data from the source computing device to the remote computing device includes combining the extent list with each previous extent list associated with each previous data capture of the application data since a last successful replication operation.

6. The computerized method of claim 1, wherein the list of changed elements is a bitmap, the bitmap including bit values of zero and one to represent whether a block or a grain within the application data is associated with a changed element, the grain being associated with a number of blocks.

7. The computerized method of claim 1, further comprising:
  storing, by the remote computing device, the application data alongside previously replicated application data on the remote computing device to create a complete representation of the changed application data and the previously replicated application data.

8. The computerized method of claim 1, further comprising replicating, by the source computing device, additional application data to the remote computing device when the remote computing device includes no previously replicated application data from the source computing device.

9. The computerized method of claim 1, wherein replicating the application data from the source computing device in parallel with copying the application data to the source computing device comprises:
  a) copying, by the source computing system, an element of changed application data from the host application to the source computing device;
  b) replicating, from the source computing device to the remote computing device, the element of changed application data; and
  repeating steps a) and b) until each element of the changed application data is copied to the source computing device and replicated to the remote computing device.

10. The computerized method of claim 9, wherein a speed associated with copying each of the elements to the source computing device is substantially similar to a speed associated with replicating to the remote computing device.

11. The computerized method of claim 9, wherein a speed associated with replicating each of the elements to the remote data management system is substantially slower than a speed associated with copying each of the elements to the source computing device, the method further comprising:
  determining, by the source computing device, all of the application data is copied to the source computing device;
  stopping, by the source computing device, the replication of the application data to the remote staging disk in response to determining that all of the application data is copied to the source staging disk;
  determining, by the source computing device, an offset associated with a data element of the application data being replicated prior to the stop; and
  resuming, by the source computing device, replication of the application data occurring after the offset from the location associated with the copied application data being stored in the source computing device to the remote computing device.

12. The computerized method of claim 1, further comprising:
  determining, by the source computing device, a bandwidth level of the network, the bandwidth level indicative of the network being at least one of a high bandwidth network and a low bandwidth network;
  enabling, by the source computing device, an application of deduplication and compression to the application data prior to replicating the application data to the remote computing device when the bandwidth level is indicative of the network being a low bandwidth network; and
  disabling, by the source computing device, the application of deduplication and compression to the application data prior to replicating the application data to the remote computing device when the bandwidth level is indicative of the network being a high bandwidth network.

13. The computerized method of claim 1, wherein a frequency associated with the copying of the application data to a location within the source computing device is higher than a frequency associated with replicating the application data from the source computing device to the remote computing device.

14. A computing system for capturing application data locally on a source data management system and performing a high performance, bandwidth optimized replication the data from the source data management system to a remote data management system either (a) in parallel with copying data from an application to the source data management system, or (b) serially by replicating the data to the remote data management system after the data is copied to the source data management system, wherein the determination to operate in parallel or serially is based on at least one of a characteristic of the data and user specified tuning parameters, the computing system comprising:
a processor; and
a memory coupled to the processor and including computer-readable instructions that, when executed by the processor, cause the processor to:
request application data from a host where an application is running, the application data comprising at least one of:
a full copy of the application data, and
changes associated with the application data, the changes including changed elements of the application data since a previous data capture of the application data from a host, and a list of changed elements associated with the application data;
receive the application data;
determine a parameter associated with an ordering of the changed elements;
begin to copy the application data to a location within the computing system;
if the parameter is indicative of a non-overlapping order, begin to replicate the application data to a remote computing device in parallel with copying the application data within the computing system, the computing system and the remote computing device being connected by a network; and
if the parameter is indicative of an overlapping order, begin to replicate serially the application data to the remote computing device after copying the application data within the computing system is complete,
thereby copying application data to a source data management system and replicating the application data from a source data management system to a remote data management system serially or in parallel based on at least one of a characteristic of the data and user specified tuning parameters.

15. The computing system of claim 14, wherein the full copy of the application data is requested when no previous captured version of the application data exists on the computing system.

16. The computing system of claim 15, wherein the full copy is automatically associated with a parameter indicating a non-overlapping order, and wherein the processor is further caused to replicate the full copy from the computing system to the remote computing device in parallel with copying the full copy from the host to the computing system.

17. The computing system of 14, wherein the list of changed elements is a list of changed extents within a block device, wherein each extent describes a range of modified bytes or modified blocks.

18. A non-transitory computer readable medium having executable instructions operable to cause an apparatus to:
request application data from a host where an application is running, the application data comprising at least one of:
a full copy of the application data, and
changes associated with the application data, the changes including changed elements of the application data since a previous data capture of the application data from a host, and a list of changed elements associated with the application data;
receive the application data;
determine a parameter associated with an ordering of the changed elements;
begin to copy the application data to a location within the apparatus;
if the parameter is indicative of a non-overlapping order, begin to replicate the application data to a remote computing device in parallel with copying the application data within the apparatus, the apparatus and the remote computing device being connected by a network; and
if the parameter is indicative of an overlapping order, begin to replicate serially the application data to the remote computing device after copying the application data within the apparatus is complete,
thereby copying application data to a source data management system and replicating the application data from a source data management system to a remote data management system serially or in parallel based on at least one of a characteristic of the data and user specified tuning parameters.

19. The non-transitory computer readable medium of claim 18, wherein the full copy of the application data is requested when no previous captured version of the application data exists on the apparatus.

20. The non-transitory computer readable medium of claim 19, wherein the full copy is automatically associated with a parameter indicating a non-overlapping order, and wherein the executable instructions are further operable to replicate the full copy from the apparatus to the remote computing device in parallel with copying the full copy from the host to the apparatus.

* * * * *